(12) United States Patent
Ikeda et al.

(10) Patent No.: US 8,233,041 B2
(45) Date of Patent: Jul. 31, 2012

(54) IMAGE PROCESSING DEVICE AND IMAGE PROCESSING METHOD FOR PERFORMING THREE DIMENSIONAL MEASUREMENTS

(75) Inventors: Yasuyuki Ikeda, Ayabe (JP); Shiro Fujieda, Kyoto (JP)

(73) Assignee: Omron Corporation, Kyoto (JP)

( * ) Notice: Subject to any disclaimer, the term of this patent is extended or adjusted under 35 U.S.C. 154(b) by 878 days.

(21) Appl. No.: 11/630,631

(22) PCT Filed: Jun. 16, 2006

(86) PCT No.: PCT/JP2006/312099
§ 371 (c)(1),
(2), (4) Date: Jan. 6, 2009

(87) PCT Pub. No.: WO2006/135040
PCT Pub. Date: Dec. 21, 2006

(65) Prior Publication Data
US 2009/0128648 A1    May 21, 2009

(30) Foreign Application Priority Data

Jun. 17, 2005   (JP) .............................. P2005-177616

(51) Int. Cl.
*H04N 15/00*    (2006.01)

(52) U.S. Cl. ......................... 348/129; 348/47; 348/137

(58) Field of Classification Search ............... 348/43–50, 348/129–130, 136–137
See application file for complete search history.

(56) References Cited

U.S. PATENT DOCUMENTS

| 4,972,494 | A |   | 11/1990 | White et al. |
|---|---|---|---|---|
| 5,978,521 | A | * | 11/1999 | Wallack et al. ............... 382/294 |
| 5,995,220 | A | * | 11/1999 | Suzuki ....................... 356/237.5 |

(Continued)

FOREIGN PATENT DOCUMENTS

EP    1 089 229 A2    4/2001

(Continued)

OTHER PUBLICATIONS

European Patent Office extended search report on application No. 06757383.2 dated Jul. 30, 2010; 10 pages.

(Continued)

*Primary Examiner* — Patrice Winder
(74) *Attorney, Agent, or Firm* — Foley & Lardner LLP

(57) ABSTRACT

An image processing device for the user to easily perform the setting for specifying the location to be performed with three dimensional measurement on the image where the photographed is shown, the device including an imaging section (1) with a first camera (C0), arranged with the optical axis directed in the vertical direction, for generating a front image of a work W, and a second camera (C1), arranged with the optical axis directed in a slanted direction, for generating a slant image of the work W. In the setting prior to the measurement, the setting object is photographed with each camera (C0, C1), and the setting is performed pm the specified region for specifying the position to be measured by the user using the front image from the first camera C0. In time of the measurement, the specified region is defined in the front image from the first camera (C0) based on the setting, and the process of specifying the position to be measured is performed in the relevant region. Furthermore, the position corresponding to the position specified in the front image is specified, and the process of calculating the three dimensional coordinate is performed with respect to the slant image from the second camera (C1).

13 Claims, 19 Drawing Sheets

U.S. PATENT DOCUMENTS

| | | | |
|---|---|---|---|
| 6,064,756 A * | 5/2000 | Beaty et al. | 382/146 |
| 6,064,759 A * | 5/2000 | Buckley et al. | 382/154 |
| 6,084,663 A * | 7/2000 | Seng | 356/237.4 |
| 6,118,540 A * | 9/2000 | Roy et al. | 356/394 |
| 6,307,210 B1 | 10/2001 | Suzuki et al. | |
| 6,333,992 B1 * | 12/2001 | Yamamura et al. | 382/149 |
| 6,445,518 B1 * | 9/2002 | Lee | 359/833 |
| 6,915,006 B2 * | 7/2005 | Beaty et al. | 382/145 |
| 7,075,565 B1 * | 7/2006 | Raymond et al. | 348/126 |
| 7,202,491 B2 * | 4/2007 | Garssen et al. | 250/559.29 |
| 7,277,187 B2 * | 10/2007 | Smith et al. | 356/601 |
| 2004/0013306 A1 | 1/2004 | Lee | |
| 2005/0089208 A1 * | 4/2005 | Dong et al. | 382/133 |

FOREIGN PATENT DOCUMENTS

| | | |
|---|---|---|
| JP | 10-054709 | 2/1998 |
| JP | 10-148517 | 6/1998 |
| JP | 11-037736 | 2/1999 |
| JP | 11-259658 | 9/1999 |
| JP | 2000-269700 | 9/2000 |
| JP | 2001-033236 | 2/2001 |
| JP | 2002-063580 | 2/2002 |
| JP | 2002-245438 | 8/2002 |
| JP | 2004-046772 | 2/2004 |
| WO | WO 94/24516 A1 * | 10/1994 |
| WO | WO 00/38494 | 6/2000 |

OTHER PUBLICATIONS

Pollefeys, Marc; Tutorial on 3D Modeling from Images, Chapter 7, Dense Depth Estimation; ECCV 2000; Jun. 26, 2000; pp. 61-70; total no. of pp. 14.

* cited by examiner

Height range: 0 to 5 mm                Height range: -15 to 15 mm

IMAGE PROCESSING DEVICE AND IMAGE PROCESSING METHOD FOR PERFORMING THREE DIMENSIONAL MEASUREMENTS

TECHNICAL FIELD

The present invention relates to a device for performing a three dimensional measurement based on an image respectively photographed with a plurality of cameras arranged so as to photograph an object from directions different from each other. "Measurement" used herein includes measurements intended for an examination. Generally speaking, assuming that some kind of measurement is performed in the process of an examination, a situation in which the final output simply implies pass or fail of the examination and the measurement value is not output is also considered when simply referring to "a measurement."

BACKGROUND ART

Conventionally, a device for performing the measurement by two dimensional image processing regarding the shape or the surface pattern of an object has been widely used in manufacturing sites of various products. In such two dimensional image processing device, measurement is performed, with the surface (e.g., bottom surface of object) representative of the object or the surface to be measured of the object as the target, based on the image photographed from a direction perpendicular to the surface, that is, the direction facing the surface.

A method of three dimensional measurement based on the principle of stereoscopical view using a plurality of cameras is known, where an examining device of a printed circuit substrate employing such method is disclosed in patent document 1. However, the conventional device for performing the three dimensional measurement limits the type and the property of the object, and is configured as a dedicated device if intended for the examination of the printed circuit substrate, for example, and thus is not realized as a device having versatility of being applied to the manufacturing sites of various products, and operability of being fully utilized without special knowledge of the three dimensional measurement.

Patent document 1: Japanese Laid-Open Patent Publication No. 2003-522347

In view of such situation, the inventors developed an image processing device with a three dimensional measurement function having versatility and being fully utilized easily by the user as in the conventional two dimensional image processing device. Under such policy, the inventors aimed to allow the user to easily perform the setting for specifying the target location of the three dimensional measurement on the image where the photographed object is shown, with the object of various shapes as the measuring target.

DISCLOSURE OF THE INVENTION (1) In order to solve the above problem, the first image processing device proposed in the present specification is an image processing device for performing a process using a first image or a front image obtained based on an image for an object photographed with a first camera and a second image based on an image photographed with a second camera arranged so at to photograph the object from a direction different from the direction photographed with the first camera; the image processing device including a setting means for a user to perform a setting on a specified region using a setting image or the front image obtained based on the image for a setting object photographed with the first camera; a position specifying means for defining a specified region based on the setting with respect to the first image or the front image obtained based on the image for an object to be measured photographed with the first camera and specifying a position on the object within the specified region; and a three dimensional measurement means for specifying a position on the second image corresponding to the position specified on the first image and calculating a three dimensional coordinate using the specified position on the first image and the position on the second image.

When the first camera is arranged so as to photograph the object in the direction of front view, and the image itself photographed with the first camera is the front image, the image for the object to be measured photographed with the first camera may be the first image or the image performed with processes of moving the image to correct the positional displacement and the like with respect to the image photographed with the first camera may be the first image. If the image for the object photographed with the first camera is a slant image, the image performed with a process of converting at least the relevant slant image to the front image is used as the first image.

According to such image processing device, the user only needs to perform the specified region setting for specifying the position on the object with respect to the front image, and thus the setting for specifying the location to be performed with three dimensional measurement is easily performed.

(2) In the above described image processing device, a conversion means for performing a conversion calculation of converting a slant image photographed with the first camera arranged so as to photograph the object from a slanted direction to the front image is further arranged. In this case, the setting image is obtained by converting the image for a setting image photographed with the first camera in a slanted direction with the conversion means; and the first image is obtained by converting the image for the object to be measured photographed with the first camera in the slanted direction with the conversion means.

According to the above configuration, the region setting with respect to the front image can be performed even if the camera is not arranged or cannot be arranged in a direction of front view with respect to the object (e.g., vertical direction of the object).

(3) Furthermore, in one embodiment of the image processing device arranged with the conversion means, the scale information for associating the dimension in the converted front image and the actual dimension of the location to be measured, a value of scale reference height or a front height consistent with the scale information, and a value of the allowable range of the front height defined so as to include the scale reference height are available. Furthermore, a two dimensional image processing means for performing two dimensional image process on the first image using the scale information; and a determining means for determining whether or not the front height indicated by the three dimensional coordinate calculated by the three dimensional means is within the allowable range are further arranged.

According to the above aspect, if the calculated three dimensional coordinate is not within the allowable range of the front height, a difference larger than the assumed extent is known to exist between the scale indicated by the scale information used in the two dimensional image processing means and the actual scale of the first image.

(4) In another aspect of the image processing device arranged with the conversion means, a scale information calculating means for calculating the scale information associating the dimension in the front image converted by the conversion means and the actual dimension of the location to be measured using the front height indicated by the three dimensional coordinate calculated by the three dimensional measurement means; and a two dimensional image processing means for performing the two dimensional image process on the first image using the scale information are further arranged.

According to the above aspect, a more accurate measurement with respect to the object can be performed since the two dimensional image process is performed using the scale information calculated from the actual measured value of the front height.

(5) In another aspect of the image processing device arranged with the conversion means, the scale information for associating the dimension in the converted front image and the actual dimension of the location to be measured, and the value of scale reference height or a front height consistent with the scale information are available; and an adjustment means for coherently changing the scale reference height and the scale information based on the operation of the user is further arranged.

According to the above aspect, when the scale reference height is adjusted so as to substantially match the actual front height of the location to be performed with the three dimensional measurement based on the operation of the user, the range where the location to be measured may appear on the second image becomes small. Therefore, if the position corresponding to the position specified on the first image is specified with the relevant small range as the target, the possibility of mistaking the correspondence of the position to be measured between the first image and the second image becomes lower, and the time required for the calculation of specifying the corresponding position also becomes shorter. Furthermore, when the scale information is properly adjusted based on the operation of the user, if various two dimensional image processes involving measurement of dimension and area are applied with respect to the first image, the error in the result thereof becomes smaller.

(6) In the image processing device of the aspect of (5), an image editing means for editing the display image with a scale figure indicating the actual dimension in a plane at a scale reference height with respect to the first image may be further arranged. In this case, the user is able to perform the adjustment operation so that the relationship between the sizes of the displayed scale figure and the image of the location to be measured becomes correct when the editing image is displayed.

(7) As a second configuration of the image processing device for solving the above problems by having the user easily execute the setting for specifying the location to be performed with three dimensional measurement on the image where the photographed object is shown, the present specification provides an image processing device for performing a process using a first image or a front image obtained based on an image for an object photographed with a first camera in a slanted direction and a second image based on an image photographed with a second camera arranged so as to photograph the object from a direction different from the direction photographed with the second camera; the image processing device including a conversion means for performing a conversion calculation for converting a slant image photographed with the first camera arranged to photograph the object from a slanted direction to the front image; a setting means for the user to perform a setting on a position to be measured using a setting image obtained by converting the image obtained for a setting image photographed with the first camera; a position specifying means for specifying a position on the object based on the setting in the first image obtained by converting the image obtained for object to be measured photographed the with the camera with the conversion means; and a three dimensional measurement means for specifying a position in the second image corresponding to the position specified on the first image and calculating a three dimensional coordinate using the specified position on the first image and the position on the second image.

According to such image processing device, the user only needs to perform the setting for specifying the position on the object with respect to the front image regardless of whether the image photographed with the camera is a slant image, and thus the setting for specifying the location to be performed with three dimensional measurement is easily performed. Furthermore, the setting is easily performed even if the camera is not arranged or cannot be arranged in the direction of front view with respect to the object.

(8) In one aspect according to the image processing device of the second configuration, the scale information for associating the dimension in the front image converted by the conversion means and the actual dimension of the location to be measured, a value of scale reference height or a front height consistent with the scale information, and a value of the allowable range of the front height defined so as to include the scale reference height are available; and a two dimensional image processing means for performing two dimensional image process on the first image using the scale information; and a determining means for determining whether or not the front height indicated by the three dimensional coordinate calculated by the three dimensional means is within the allowable range are further arranged.

According to the above aspect, if the calculated three dimensional coordinate is not within the allowable range of the front height, a difference larger than the assumed extent is known to exist between the scale indicated by the scale information used in the two dimensional image processing means and the actual scale of the first image.

(9) In another aspect of the image processing device of the second configuration, a scale information calculating means for calculating the scale information associating the dimension in the front image converted by the conversion means and the actual dimension of the location to be measured using the front height indicated by the three dimensional coordinate calculated by the three dimensional measurement means; and a two dimensional image processing means for performing the two dimensional image process on the first image using the scale information are further arranged.

According to the above aspect, a more accurate measurement with respect to the object can be performed since the two dimensional image process is performed using the scale information calculated from the actual measured value of the front height.

(10) In another aspect of the image processing device of the second configuration, the scale information for associating the dimension in the front image converted by the conversion means and the actual dimension of the location to be measured, and the value of scale reference height or a front height consistent with the scale information are available; and an adjustment means for coherently changing the scale reference height and the scale information based on the operation of the user is further arranged.

According to the above aspect, when the scale reference height is adjusted so as to substantially match the actual front height of the location to be performed with the three dimensional measurement based on the operation of the user, the range where the location to be measured may appear on the second image becomes small. Therefore, if the position corresponding to the position specified on the first image is specified with the relevant small range as the target, the possibility of mistaking the correspondence of the position to be measured between the first image and the second image becomes lower, and the time required for the calculation of specifying the corresponding position also becomes shorter. Furthermore, when the scale information is properly adjusted based on the operation of the user, if various two dimensional image processes involving measurement of dimension and area are applied with respect to the first image, the error in the result thereof becomes smaller.

(11) In the image processing device of the aspect of (10), an image editing means for editing the display image with a scale figure indicating the actual dimension in a plane at a scale reference height with respect to the first image may be further arranged. In this manner, the user is able to perform the adjustment operation so that the relationship between the sizes of the displayed scale figure and the image of the location to be measured becomes correct when the editing image is displayed.

(12) The first image processing method proposed in the present specification is an image processing method device for performing a process using a first image or a front image obtained based on an image for an object photographed with a first camera and a second image based on an image photographed with a second camera arranged so at to photograph the object from a direction different from the direction photographed with the first camera; the image processing method including setting step of displaying a setting image or a front image obtained based on the image for a setting object photographed with the first camera, and having a user perform a setting for a specified region using the setting image; position specifying step of defining a specified region based on the setting with respect to the first image or the front image obtained based on the image for an object to be measured photographed with the first camera and specifying a position on the object within the specified region; and three dimensional measurement step of specifying a position on the second image corresponding to the position specified on the first image and calculating a three dimensional coordinate using the specified position on the first image and the position on the second image.

(13) The second image processing method proposed in the present specification is an image processing step for performing a process using a first image or a front image obtained based on an image for an object photographed with a first camera arranged so as to photograph the object in a slanted direction and a second image based on an image photographed with a second camera arranged so at to photograph the object from a direction different from the direction photographed with the first camera; the image processing method including setting step of converting the image for a setting image photographed with the first camera to a setting image through a conversion calculation of converting a slant image photographed with the first camera to the front image, and having a user perform a setting on a position to be measured using the setting image; position specifying step of converting the image for the object to be measured photographed with the first camera to a first image through the conversion calculation and specifying the position on the object based on the setting on the first image; and three dimensional measurement step of specifying a position on the second image corresponding to the position specified on the first image and calculating a three dimensional coordinate using the specified position on the first image and the position on the second image.

According to the first and the second image processing methods, the user can easily perform the setting for specifying the location to be performed with the three dimensional measurement on the image where the photographed object is shown.

BRIEF DESCRIPTION OF THE DRAWINGS

The invention, together with objects and advantages thereof, may best be understood by reference to the following description of the presently preferred embodiment together with the accompanying drawings in which.

BEST MODE FOR CARRYING OUT THE INVENTION

Figure 1:
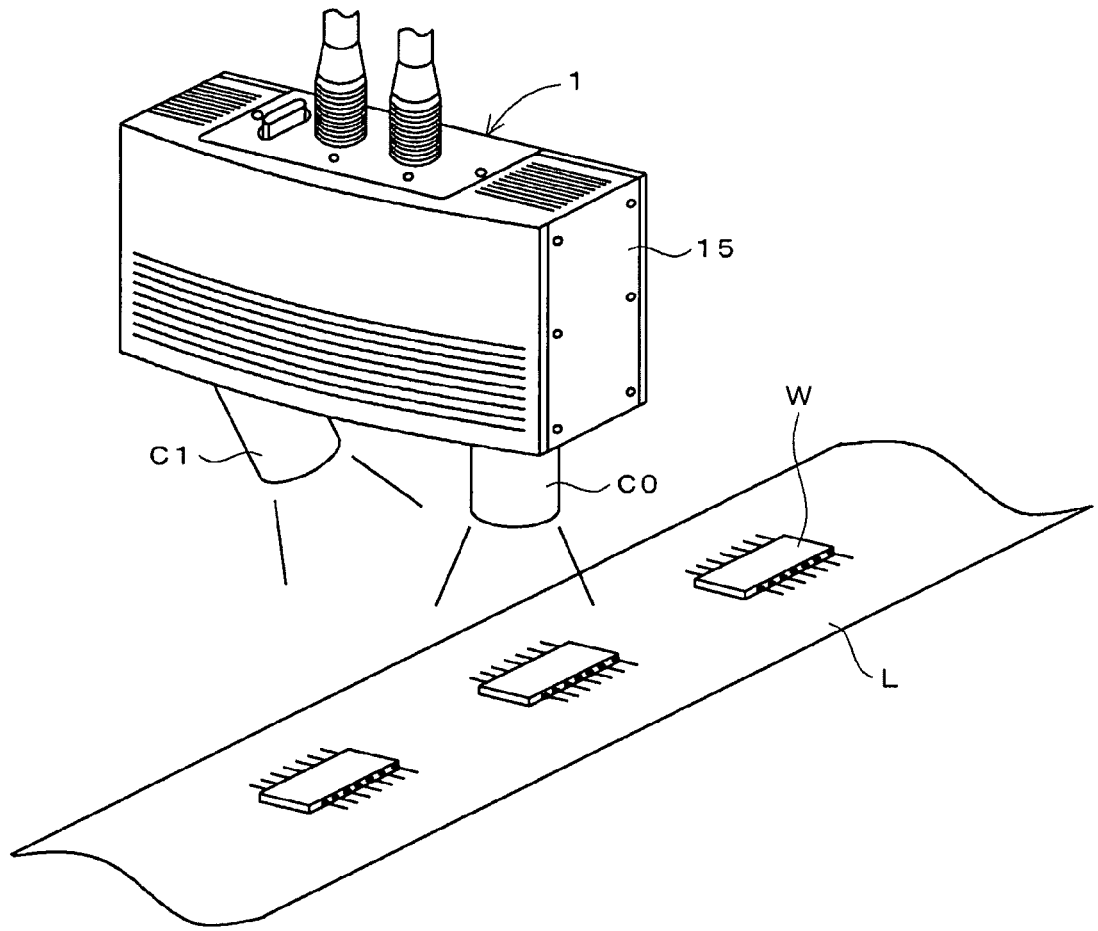
FIG. 1 is a perspective view showing a configuration of an imaging section of an examining device applied with the present invention and an installation example.

FIG. 1 shows a configuration of an imaging section of an examining device (image processing device) applied with the present invention and an installation example thereof. The examining device has both three dimensional and two dimensional measurement process functions, where an examining object W (hereinafter referred to as "work W") conveyed through an examination line L of a factory is sequentially imaged by the imaging section 1, and the measurement process and discrimination process corresponding to the various examination purposes are executed. The imaging section 1 is configured by two cameras C0, C1 incorporated in a housing 15, and is arranged above the examination line L. One camera C0 is installed with the optical axis thereof directed in the vertical direction (facing the work W). The other camera C1 is installed with the optical axis slanted so that the viewing field overlaps with the camera C0. The imaging surface defining the range of viewing field of camera C0 and camera C1 is a rectangle, and the camera C1 is arranged with respect to the camera C0 so as to line along a lateral direction (correspond to x-axis direction of image A0 of FIG. 2) of the range of viewing field of the camera C0.

Figure 2:
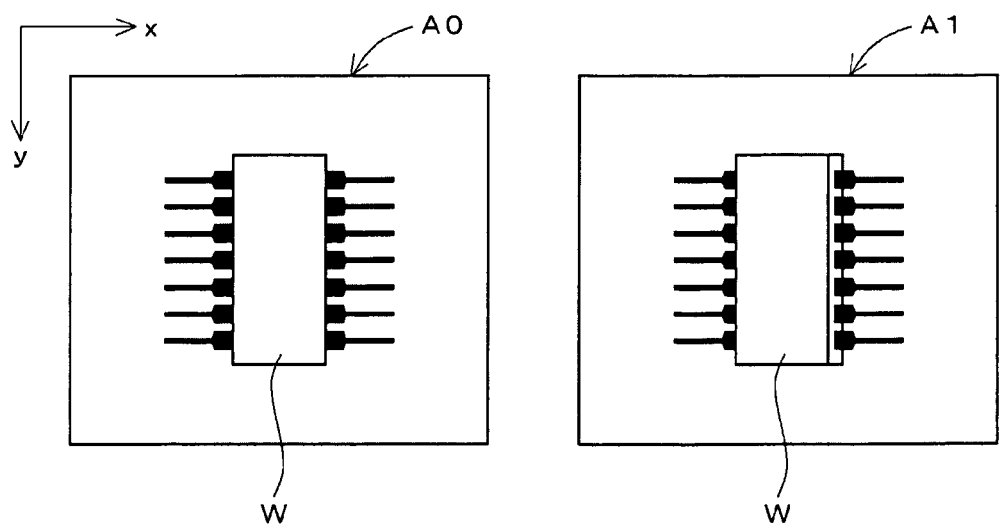
FIG. 2 is an explanatory view showing an example of an image imaged with each camera.

FIG. 2 shows an example of images of the work W generated by each camera C0, C1. A0 in the figure is the image from the camera C0, and A1 is the image from the camera C1. In FIG. 2 and the subsequent figures illustrating the image of the work W such as FIG. 5, W is used as in FIG. 1 to refer to the work in each image A0, A1. Furthermore, the lateral direction (horizontal direction) of the image A0 is referred to as the x-axis direction and the longitudinal direction (vertical direction) as the y-axis direction.

Since the camera C0 is installed with the optical axis directed in the vertical direction, the image A0 shows the state in which the upper surface of the work W is viewed from the front. Since the camera C1 is installed with the optical axis in a slanted state, the image A1 shows the work W viewed at an angle. The image A0 from the camera C0 is hereinafter referred to as "front image A0" and the image A1 from the camera C1 as "slant image A1." The front image A0 corresponds to the "first image" and the slant image A1 corresponds to the "second image." In the relevant examining device, the position to be measured is first specified using the front image A0 in which the distortion of the image is small (close to plan view of work W), and subsequently, the position corresponding to the position to be measured on the front image A0 is specified on the slant image A1.

Figure 3:
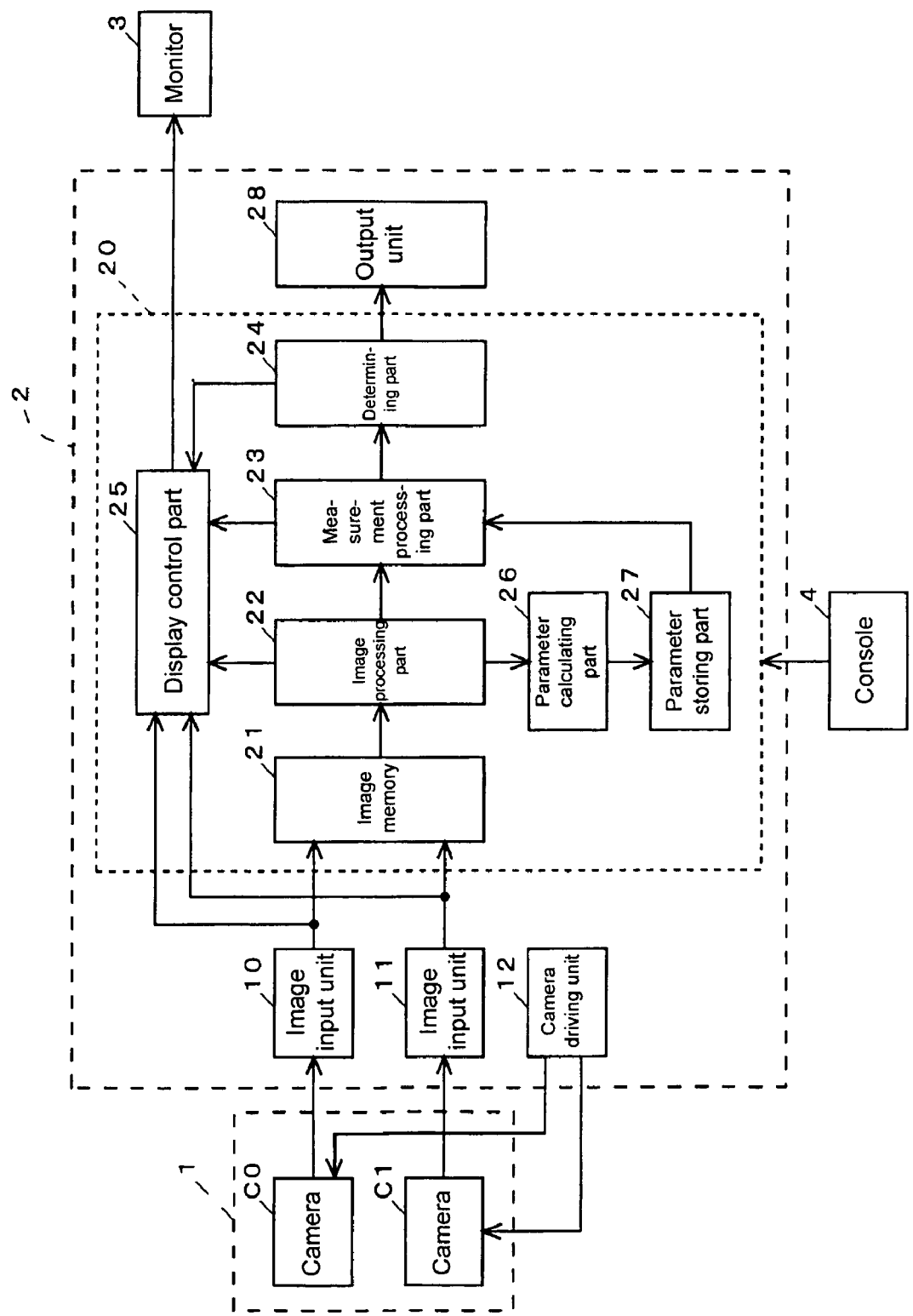
FIG. 3 is a block diagram of the examining device.

FIG. 3 is a block diagram showing the entire configuration of the examining device. The examining device is configured by a main body section 2, a monitor 3, a console 4 and the like in addition to the imaging section 1. The main body section 2 is arranged with image input units 10, 11 for each camera C0, C1, a camera driving unit 12, a calculation processing unit 20, an output unit 28 and the like.

The camera driving unit 12 receives a detection signal from a work detection sensor (not shown) and simultaneously drives each camera C0, C1. The image signals generated by each camera C0, C1 are input to the respective image input unit 10, 11, and digitally converted. The digital image (front image A0 and slant image A1) for measurement process is thereby generated with respect to each camera.

The calculation processing unit 20 is configured by a computer, and after executing the measurement process using the images of the cameras C0, C1, determines the adequacy of the work W from the process result. The output unit 28 is an output interface for outputting the results of the measurement process and the determination process to external equipments such as PLC.

The calculation processing unit 20 is arranged with an image processing part 22, a measurement processing part 23, a determining part 24, a display control part 25, a parameter calculating part 26, a parameter storing part 27 and the like in addition to the image memory 21 for storing the images A0, A1. Each part other than the image memory 21 and the parameter storing part 27 are functions set in the computer serving as the calculation processing part 20 by a dedicated program. The image memory 21 and the parameter storing part 27 are set in a memory (RAM etc.) of the computer. Although not shown in FIG. 3, a memory for registering the information (setting condition of examining region, image of model etc.) necessary for the examination is also arranged in the calculation processing unit 20. The registration process to the registration memory and the processes executed by each processing part of the calculation processing unit 20 are appropriately set and changed according to the operation of the console 4.

The image processing part 22 specifies the site to be examined of the work W through binarization, edge extraction, pattern matching and the like. The measurement processing part 23 executes the process of measuring the position, size and the like for the site to be examined specified by the image processing part 22. The image processing part 22 and the measurement processing part 23 execute the processes of two dimensional measurement and three dimensional measurement.

The determining part 24 determines the defectiveness of the work W by comparing the measurement result of the measurement processing part 23 with a predetermined threshold value and the like. The measurement result and the determination result are output to the output unit 28 and the display control part 25. The display control part 25 controls the displaying operation of the monitor 3, and displays the front image A0 and the slant image A1 generated in the image input units 10, 11 in parallel in one screen. Furthermore, the control part 25 receives the process results of the image processing part 22, the measurement processing part 23, and the determining part 24 and displays the same along with the images.

Various coefficients to be used in the calculation for the three dimensional measurement are stored in the parameter storing part 27. The values of the coefficients vary according to the relationship (distance between origins of each coordinate system, rotational displacement amount of the stereo coordinate system with respect to spatial coordinate system etc.) between a stereo coordinate system configured by each camera C0, C1 and a spatial coordinate system representing the position in the actual space (the coefficients are hereinafter referred to as "parameters"). The parameters are calculated by the image processing part 22 and the parameter calculating part 26 prior to the examination, and stored in the parameter storing part 27. A calibration work having a plurality of characteristic points is used in the process of calculating the parameters. Furthermore, parameters configuring a homographic matrix of calculation equation (1) to be hereinafter described are also registered in the parameter storing part 27.

The examining device may present plural types of examination menus to the user and accepts the selected operation and builds the algorithm for the examination. Furthermore, the examination by the two dimensional measurement process and the examination by the three dimensional measurement process may be selected and executed according to the site to be examined. In the examination by the two dimensional measurement process, pattern matching process, binarization process, edge extraction process and the like are executed with the front image A0 from the camera C0 as the target, and the entire work or the site to be examined in the work is specified.

The examining device also effectively utilizes the front image A0 from the camera C0 in the examination by the three dimensional measurement process to speed up the three dimensional measurement process. This will be hereinafter described in detail.

Figure 4:
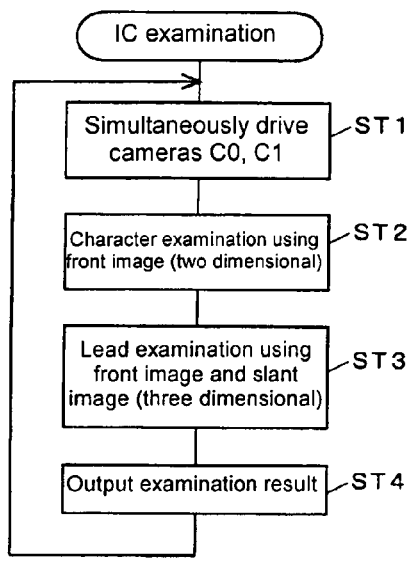
FIG. 4 is a flow chart illustrating the procedures for examining an IC.

FIG. 4 illustrates the procedures of the examination which are performed when the work W is an IC. The procedures start when the detection signal from the work detection sensor is received. In the first ST1 (ST is an abbreviation of "step", and is the same hereinafter), the cameras C0, C1 are simultaneously driven by the camera driving unit 12 to generate the front image A0 and the slant image A1.

In ST2, the examination is executed targeting the character printed at the package portion of the IC. In the relevant examination, the two dimensional image processing using only the front image A0 is executed. For example, the printed region of the character is extracted through pattern matching process, and the adequacy of the printed state of the character is determined from the correlation in time of matching and the matching position.

In ST3, the coordinate of the distal end position of each lead is obtained through edge detection method in the front image A0, and the coordinate of the distal end position of each corresponding lead is obtained through edge detection method in the slant image A1. The three dimensional coordinate of the distal end of each lead is obtained from the coordinate of the distal end position of each lead in both images, and determination is made on whether or not abnormality such as lift or bend is found at each lead from the calculated value.

After the examinations of ST2 and ST3 are finished, the results of each examination are output to the external equipments and the monitor 3 in ST4. When the next IC is detected by the work detection sensor, the process returns to ST1 and the procedures similar to the above are executed.

Therefore, the examination by the two dimensional measurement and the examination by the three dimensional measurement are continuously executed by imaging the work W once with the two cameras C0, C1. The measurement process of satisfactory precision can be performed using the image without distortion in the character since the front image A0 is used in the two dimensional measurement process.

In performing the three dimensional measurement process, the corresponding point to be measured is specified between the front image A0 and the slant image A1, and the coordinates of each specified point is applied to the calculating equation based on the principle of triangulation to calculate the three dimensional coordinates.

Figure 5:
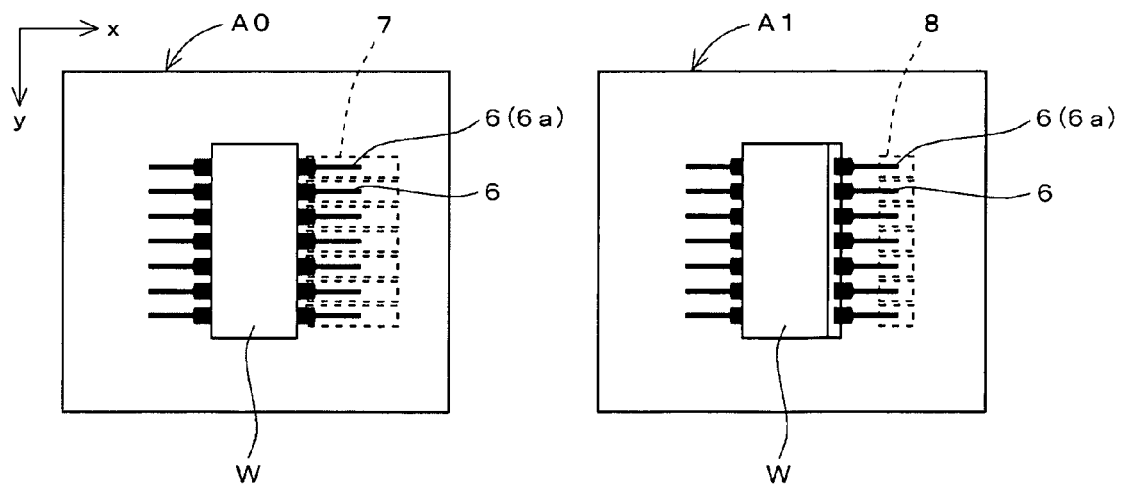
FIG. 5 is an explanatory view showing a setting example of a detection region.

FIG. 5 shows the setting example of the detection region in the front image A0 (specified region set by the user) and the detection region in the perspective region A1. The longitudinal direction (direction along the array of the leads in the front image A0) of the image is the y-direction, and the lateral direction (direction along the length of the lead in the front image A0) is the x-direction. In the front image A0, individual detection region 7 is set for every lead 6, and one edge point corresponding to the distal end of the lead is specified for every detection region 7.

Since the cameras C0, C1 are lined in the x-direction, parallax is produced mainly in the x-direction. The image within the detection region 7 is binarized, and the obtained binarized image is projected along the y-direction to create a histogram with the x-direction in the horizontal axis and the projected number of "light" pixels or the number of "dark" pixels in the vertical axis. The x coordinate of the location where the value of the histogram drastically changes is considered as the x coordinate of the distal end of the lead 6. The y coordinate of the center point in the y-direction of the detection region 7 is applied for the y coordinate of the distal end of the lead 6. The point indicated by the obtained x coordinate and the y coordinate is referred to as the edge point.

The image within the detection region 7 is binarized herein, but is not limited thereto, and the concentration of each pixel may be integrated in the y-direction with the image within the detection region 7 still as the gray image, and the x coordinate of the location (e.g., location traversing the threshold value) where the value of the obtained integrated concentration distribution drastically changes along the x-direction may be obtained.

The position of the edge is thus detected along one specific direction. In the example of FIG. 5, the x-direction is the edge detecting direction. The detection region 7 is set in the front image A0 and then the edge detection direction is specified with respect to the detection region 7. However, it is not limited thereto, and the detection region 7 that has a unique edge detecting direction from the beginning may be set, or the edge detecting direction of the detection region 7 may be specified first and then the detection region 7 may be set in the front image A0.

The detection region 8 is set for every lead 6 in the slant image A1 as well. The detection regions 8 are set using the coordinate of the edge point specified in each detection region 7 of the front image A0 and the height range (range that may be taken by the height of the target location of the three dimensional measurement) specified by the user based on the calculating equation (eq. 1 to be hereinafter described) for converting one point on one image to a point on the other image. The height herein is the height in the vertical direction, that is, the front direction with the mounting surface of the work W as the reference, and is also referred to as a front height. The reference of the height is not limited to the mounting surface of the work W, and may be the position of the camera C0, or other arbitrary position. The height range specified by the user is the target range of the three dimensional measurement along the optical axis of the camera C0.

Only the region setting with respect to the lead on the right side of the work W is shown in FIG. 5, but similar setting is performed with respect to the lead on the left side (same in the following figures).

Figure 6:
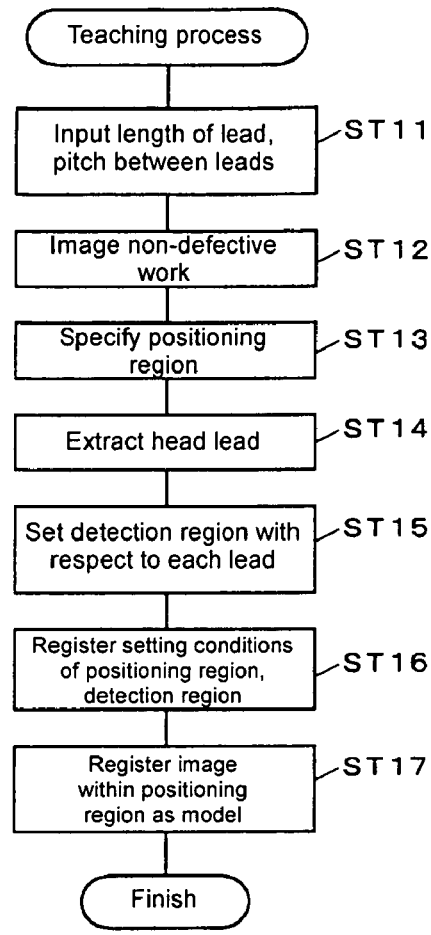
FIG. 6 is a flow chart illustrating the procedures of the teaching process.

FIG. 6 illustrates the procedures of a teaching process (setting process) for the lead examination of the IC. The procedures are executed before starting the IC examination of FIG. 4. In ST11, which is the first step of the procedure, the length of the lead 6, the pitch between the leads 6 and the like are input for the work W (IC in this example) to be examined. The input data are registered in a work memory and used in ST15 to be hereinafter described.

In ST12, a non-defective work is installed as the setting object at a position to be imaged, and is imaged with cameras C0, C1. In the teaching process, only generation of the front image A0 from the camera C0 is sufficient, but each camera C0, C1 is simultaneously driven also in time of the teaching process, and the two generated images are displayed side by side on the monitor 3.

Figure 7:
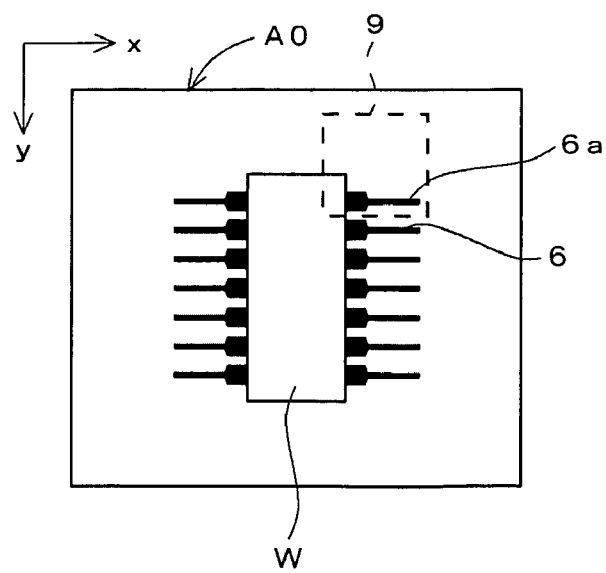
FIG. 7 is an explanatory view showing a setting example of the positioning region.

In ST13, the specifying operation of the positioning region is accepted using the front image A0 serving as the setting image. FIG. 7 shows a display example of the front image A0 in time of the specifying operation, where 9 in the figure is the positioning region. The positioning region 9 is used to extract the lead at the very end out of the leads 6 formed in a line (lead 6a of uppermost end in the figure, which is hereinafter referred to as "head lead 6a"). In the example of FIG. 7, a square region 9 where only the head lead 6a is included is set. The size of the positioning region 9 is adjusted so that the head lead 6a in the positioning region 9 can be imaged even if the work W is displaced to an assumed extent. The positioning region 9 is set so that the head lead 6a is imaged in the lower half of the region. The lead thus may not be imaged in the upper half of the region of the positioning region 9, and thus the image imaged in the lower half of the region of the positioning region 9 can be confirmed as the head lead 6a.

Returning back to FIG. 6, after the positioning region 9 is specified, the head lead 6a is extracted from the positioning region 9 in ST14. In the extraction process, the x coordinate and the y coordinate of the distal end of the head lead 6a are obtained through a method of, for example, binarizing the image within the positioning region 9, and projecting the binarized image along the y-axis direction and the x-axis direction. Alternatively, the border line of the lead 6a may be extracted by extracting the edge and the concentration gradient direction within the positioning region 9, and the x coordinate and the y coordinate of the distal end of the lead 6a may be obtained.

In ST15, the detection region 7 of each lead 6 is set based on the x coordinate and the y coordinate of the distal end of the head lead 6a, and the data input in ST11. Specifically, the length of the lead 6 and the pitch between the leads 6 on the image are calculated using the data input in ST11, number of pixels and magnification of the camera C0, and the like and the size of each detection region 7 and the interval between the regions are determined based on the calculated value. The data, that is, the setting condition necessary for setting the detection region 7 with respect to each lead 6 including the relevant lead 6a is formed with the position of the head lead 6a as the reference.

This method can be adopted since the front image A0 reflecting as is, the properties (length of each lead is equal, pitch between the leads is equal etc.) of the site to be examined of the work W is used. Therefore, if the head lead 6a can be extracted in the positioning region 9 set by the user, the detection region 7 can be set for all the leads 6 without extracting the other leads 6, thereby greatly enhancing the processing efficiency.

In ST16, the setting condition (position and size of region) of the positioning region 9 specified in ST13 and the setting condition of the detection region 7 set in ST15 are registered in the registration memory. In ST17, the image within the positioning region 9 is registered in the registration memory as the model. A series of teaching processes are thereby terminated.

The series of processes from ST11 to ST17 are equivalent to the user performing a setting for the specified region using the setting image or the front image obtained based on the image for the setting object photographed with the first camera (generally, the user performing the setting for the position to be measured). The calculation processing unit 20, on which the program for the teaching process operates, serves as a setting means for executing the series of processes.

Desirably, the image in which the detection region 7 set by the formed setting conditions is shown overlapping the front image A0 is displayed on the monitor 3, and registration is performed according to the confirming operation of the user prior to executing ST16. The position and the size of the detection region 7 may also be fine tuned.

Figure 8:
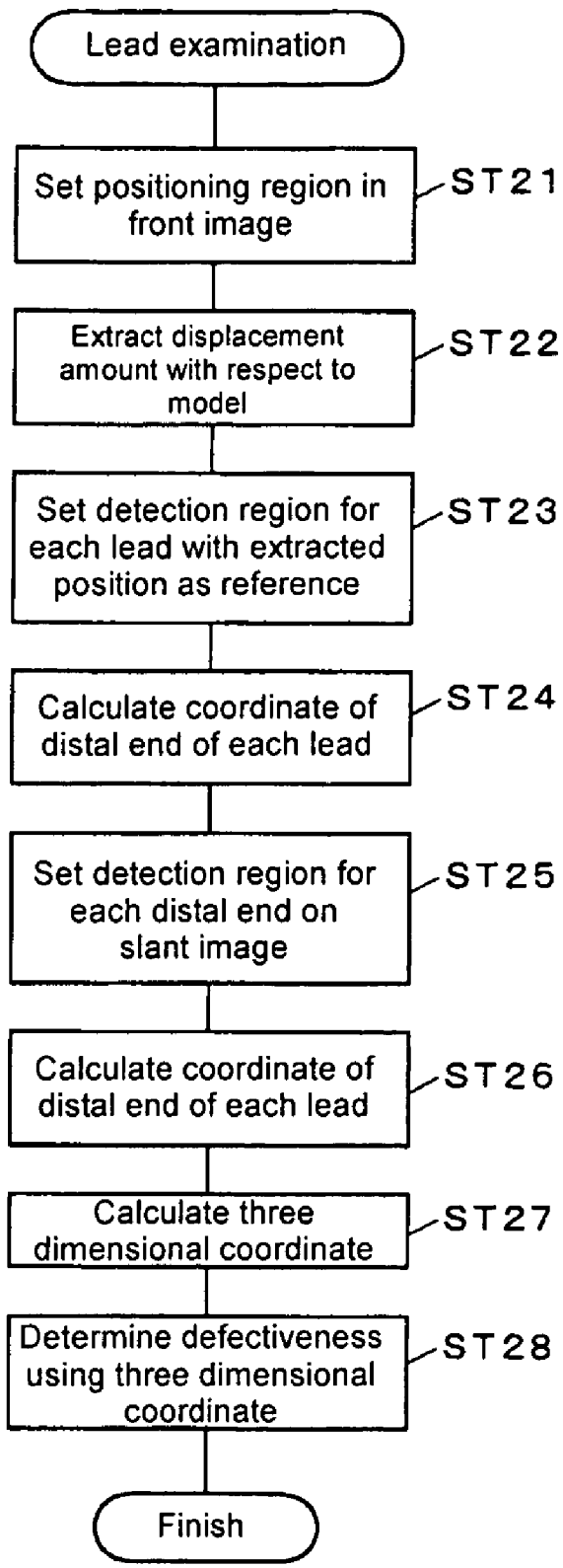
FIG. 8 is a flow chart illustrating the detailed procedures of the lead examination.

FIG. 8 illustrates the detailed procedures related to the lead examination (ST3 of FIG. 4) of the IC. The processes of ST21 to ST24 of the procedure are performed on the front image A0, which is the image obtained by photographing the object to be measured. First, in ST21, the positioning region 9 is set in the front image A0 based on the setting conditions registered in teaching. In ST22, the image within the positioning region 9 and the model registered in ST 17 of the teaching process are compared, and the displacement amount with respect to the model is extracted (method of pattern matching and the like is applied in this process).

In ST23, the setting conditions of the detection region 7 registered in time of teaching are adjusted based on the displacement amount extracted in ST22, and the detection region 7 of each lead is set as the specified region by the adjusted setting conditions. Since the distortion of the work W on the image does not need to be taken into account according to the front image A0, the displacement amount of the positioning region 9 can be applied to each detection region 7 as is, and the detection region 7 can be set for each lead 6 with the positional relationship similar to that in time of teaching.

Figure 9:
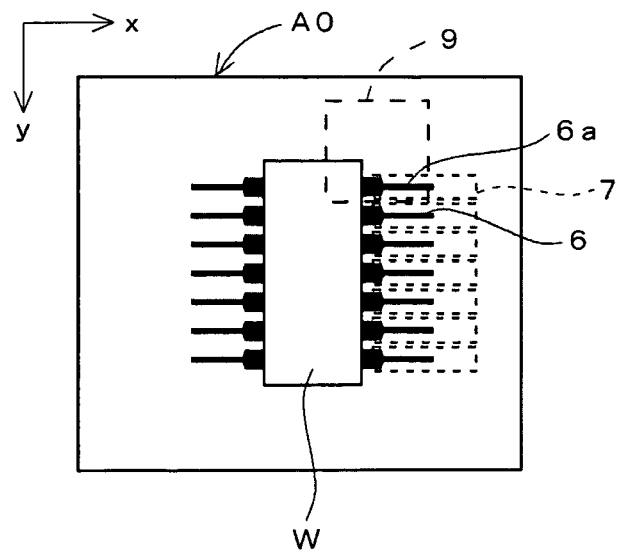
FIG. 9 is an explanatory view showing the relationship of the positioning region and the detection region with respect to the work in the front image in time of the examination.

FIG. 9 shows one example of the front image A0 in time of the examination. The work W in this example is displaced to the right side from the image A0 in time of teaching shown in FIG. 7, and thus the distal end of the lead 6 is outside the positioning region 9. However, the detection region 7 is set for all the leads 6 set with the conditions similar to those shown in FIG. 4 since the above described adjustment process is performed on the detection region 7. In this example, the position (position with respect to the frame of the image) within the image of the detection 7 is adjusted in accordance with the position displaced work W, but in place thereof, the entire content of the image may be moved so that the work W is at a constant positional relationship with respect to the frame of the image even if the work W is position displaced, and the detection region 7 may be set to always be at a constant position with respect to the frame of the image.

After the detection region 7 is set with respect to each lead in such manner, the x, y coordinates of the distal end of the lead are acquired with respect to each detection region 7 in ST24. The series of processes from ST21 to ST24 are equivalent to defining the specified region based on the setting with respect to the first image or the front image obtained based on the image for the object to be measured photographed with the first camera, and specifying the position on the object within the relevant specified region (more generally, specifying the position on the object based on the setting). The calculation processing unit 20, on which the program combined so as to execute the procedures for the lead examination process operates, serves as a position specifying means for executing the series of processes.

In ST25, the detection region 8 for detecting the distal end position of each lead is set on the slant image A1. Furthermore, in ST26, the process similar to ST24 is executed in the set detection region 8, and the x, y coordinates of the distal end of the lead are calculated. The process of setting the detection region 8 and calculating the x, y coordinates is equivalent to specifying the position on the section image corresponding to the position specified in the first image.

Subsequently, in ST27, the three dimensional coordinate is calculated using the coordinates calculated in ST24, 26. This process is equivalent to calculating the three dimensional coordinate using the position on the first position and the position on the second image that have been specified. The calculation processing unit 20, on which the programs combined so as to execute the procedures for specifying the position in the second image and calculating the three dimensional coordinate operates, serves as a three dimensional measurement means for executing the series of processes. In ST28, the defectiveness of the distal end of each lead is determined by comparing the calculated three dimensional coordinate with a reference value registered in advance. For example, if the distal end of one of the leads is lifted, the z coordinate representing the height of the relevant distal end takes a value exceeding the reference value, and the relevant lead is determined as being defected.

Figure 10:
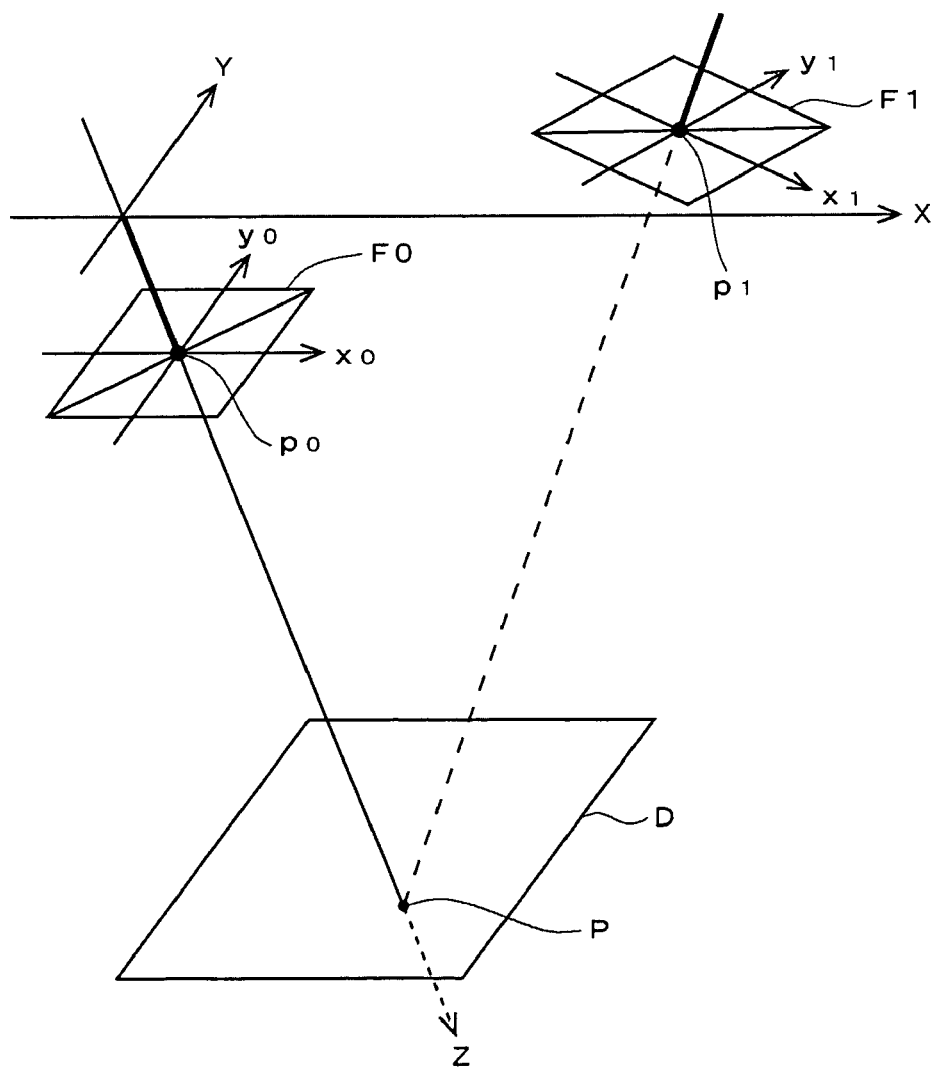
FIG. 10 is an explanatory view showing the relationship of the corresponding points between each image.

The setting of the detection region 8 of ST25 will now be described in detail. FIG. 10 shows a state in which a point P on a plane D at an arbitrary height position in the space is imaged to the respective point p0, p1 on the imaging surfaces F0, F1 of the cameras C0, C1. In FIG. 10, X, Y, Z are the coordinate axes representing the three dimensional space, and the plane D is parallel to the XY surface. The two dimensional coordinate system of the axes of x0, y0 is set in the imaging surface F0, and the two dimensional coordinate system of the axes of x1, y1 is set in the imaging surface F1. In FIG. 10, the point on the plane D imaged on the origin of both imaging surfaces is P, but is not limited thereto, and the position of the point P is arbitrary on the plane D.

Assuming the coordinate of the imaged position (point p0) of the point in the imaging surface F0 is $(x_{cam0}, y_{cam0})$, and the coordinate of the imaged position (point $p_1$) of the point P in the imaging surface F1 is $(x_{cam1}, y_{cam1})$, the relationship between $p_0$, $p_1$ is as expressed in equation (1).

Equation (1)

$$\lambda \begin{pmatrix} x_{cam1} \\ y_{cam1} \\ 1 \end{pmatrix} = H_z \begin{pmatrix} x_{cam0} \\ y_{cam0} \\ 1 \end{pmatrix} \quad (1)$$

In equation (1), HZ is the homographic matrix of 3×3 representing the relationship between the imaged position on the imaging surface F0 and the imaged position on the imaging surface F1 for the point on the plane D of height Z, and is a constant. The matrix HZ can be obtained through calibration using the known coordinates on the plane D in advance (see non-patent document 1 for detailed description of calibration).

Non-patent document 1: Nobuhiro Miichi; Toshikazu Wada: Ryuji Matsuyama "Calibration of Projector-Camera System" (searched Jun. 1, 2005), internet: URL:http://vision.kuee.Kyoto-u.ac.jp/Research/Thesis/Thesis-PDF/Miichi-2002-P-147.pdf.

When assuming the edge point of the lead extracted in each detection region 7 of the front image A0 as point $p_0$, and substituting the coordinate thereof to $(x_{cam0}, y_{cam0})$ of equation (1), the calculated $(x_{cam1}, y_{cam1})$ is assumed to be equivalent to the position of the distal end of the lead in the slant image A1. However, if the height of the distal end of the lead is assumed to change, the height Z of the plane D accordingly changes, and thus the homographic matrix HZ changes and the values of $(x_{cam1}, y_{cam1})$ also changes.

Figure 11:
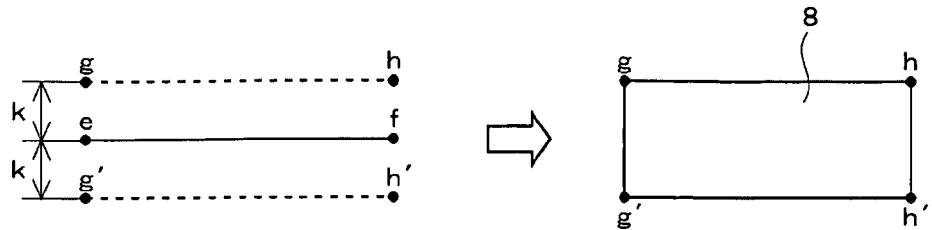
FIG. 11 is an explanatory view showing a method of setting a search region.

In ST25, equation (1) is executed using the homographic matrix HZ corresponding to the respective height Z for when the upper limit value of the assumed height range (target range of the three dimensional measurement along the optical axis of camera C0) is height Z of the plane D, and for when the lower limit value is height Z, and the coordinates of the two points e, f shown in FIG. 11 are obtained as $(x_{cam1}, y_{cam1})$. In the slant image A1, the line segment ef is parallel displaced to each side in the vertical direction by half value width k of the detection region 7 on the front image A0 side to set the line segment gh and the line segment g'h', and the rectangular region ghh'g' connecting the four points is assumed as the detection region 8.

Figure 12:
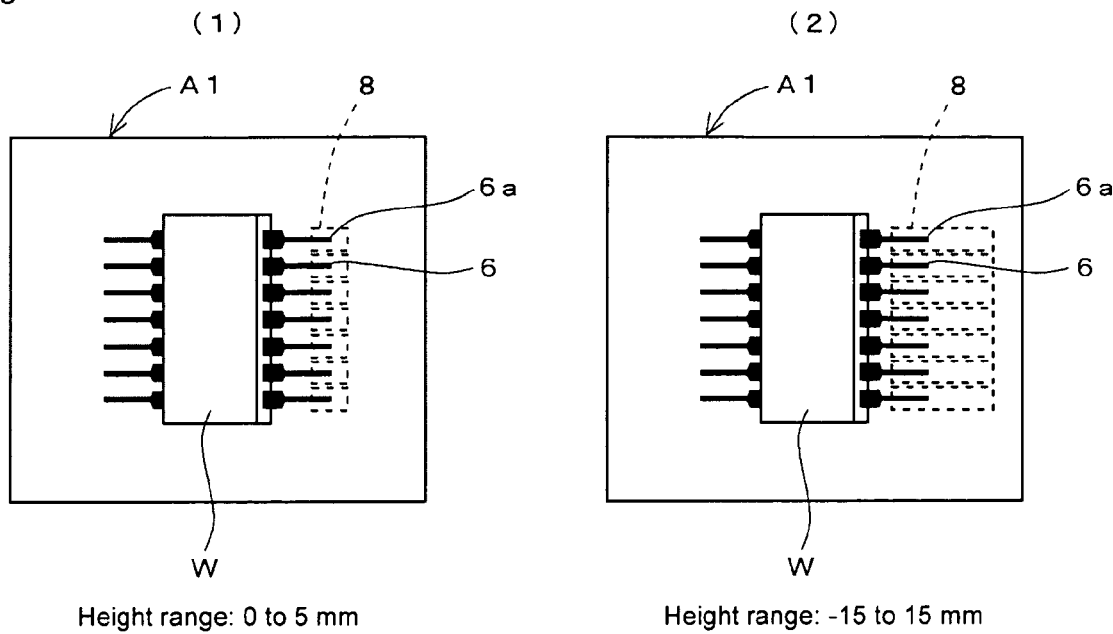
FIG. 12 is an explanatory view showing the relationship between the height range and the search region.

FIG. 12 shows the comparison in the size of the detection region 8 of when the height range the lead 6 may take is 0 to 5 mm and of when the height range is −15 to 15 mm with respect to the slant image A1, similar to FIG. 5. As apparent from the example, the detection region 8 becomes smaller as the fluctuation width of the height range becomes smaller. In FIG. 12, each detection region 8 is simplified and drawn parallel to each other, but actually, distortion is produced on the slant image A1 such that the square object is imaged as a trapezoid due to the effect of the law of perspective, and thus each detection region 8 is in a non-parallel arrangement such that the distance between the center lines (line segment ef) becomes larger on the right side of the figure. In each detection region 8, the projection of the binarized image for obtaining the position of the distal end of the edge is performed in a direction perpendicular to the center line of the detection region 8.

In the above examining device, the detection region 7 corresponding to each lead 6 is set to specify the position of the distal end of the lead in the reference image A0, but in place thereof, one detection region long in the y-axis direction may be set so as to include the distal end of each lead, and the position of the distal end of each lead may be individually obtained within the relevant region.

A case of examining the height of each key with the work (remote controller, telephone etc.) arranged with the push-type character key as the examining target will now be described. In such examination, a method of registering the model image at the preparation stage of the examination, and searching for the regions that match the model image in the front image A0 and the slant image A1 is used.

Figure 13:
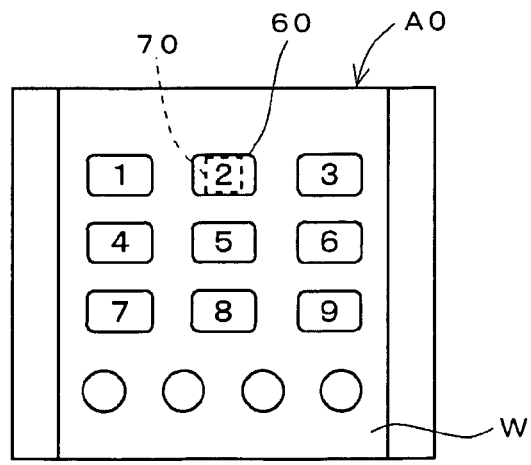
FIG. 13 is an explanatory view showing a model registering example with respect to a site to be examined on the work.

In the preparation stage of the examination, the region 70 including the character drawn on the key 60 is specified with respect to each key 60 using the front image A0 obtained by imaging the non-defective work W, which is the setting object, as shown in FIG. 13, and the image within the region 70 is registered as the model. This process is equivalent to the user performing a setting for the position to be measured using the setting image, which is the front image, obtained based on the image for obtained the setting object photographed with the first camera. That is, although only the model image is registered and the position to be measured is not directly specified, the regions that match the model image are assumed as the region to be measured in time of examination, and thus the position to be measured is indirectly set by registering the model image. Although not shown, the region to search for the regions that match the model image in time of the examination may be specified in view of the assumed positional displacement amount of the work W in time of the examination. The region to be searched for is equivalent to the specifying region.

Figure 14:
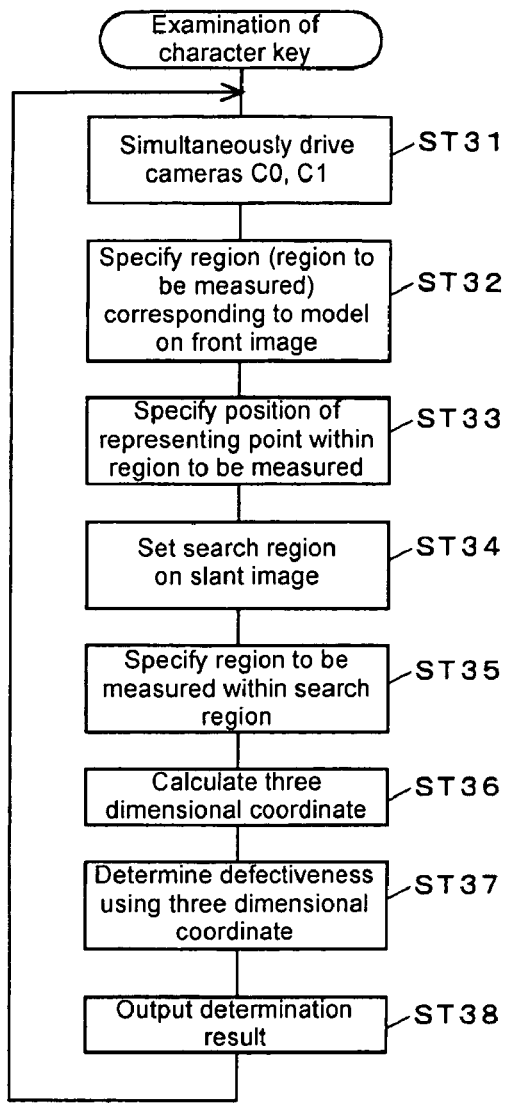
FIG. 14 is a flow chart illustrating the procedures of the examination of the character key.

FIG. 14 illustrates the procedures of the examination. In ST31, each camera C0, C1 are simultaneously driven to generate images. In ST32, the pattern matching process using the model registered before the examination is executed on the front image A0, and the region that best matches the model is specified as the region to be measured. The search for the region to be measured is performed only within the specified region if the specified region is set. The specifying process of the region to be measured is performed for every model corresponding to each key 60, but the following description is made on one model to simplify the description.

After the region to be measured is specified, the coordinate of the representing point (e.g., center point of region) of the relevant region is specified in ST33. This is equivalent to specifying the position on the object based on the setting performed using the setting image. A plurality of representing points may be specified (e.g., points corresponding to a plurality of characteristic points on the model defined in advance). In ST34, the search region is set on the slant image A1 based on the coordinate of the representing point. In this case as well, similar to setting the detection region 8 in the lead examination described above, the homographic matrix HZ is set with the upper limit and the lower limit specified in advance as the height Z, the calculation is executed twice using the coordinate of the representing point and the upper limit and the lower limit of the height range, so that the range where the representing point may be present on the image A1 is obtained and the region taking the size of the model into account to the relevant range is assumed as the search region.

In ST35, the pattern matching process with the model is executed in the search region to specify the region to be measured and the position of the representing point in the region. In ST36, the three dimensional coordinate is calculated using the coordinate of the representing point of the region to be measured in each image front and slant A0, A1. In ST37, the adequacy of the height of the key is determined by comparing the Z coordinate of the calculated three dimensional coordinate with a predetermined threshold value. The determination result is output in ST38, and the process is terminated.

Figure 15:
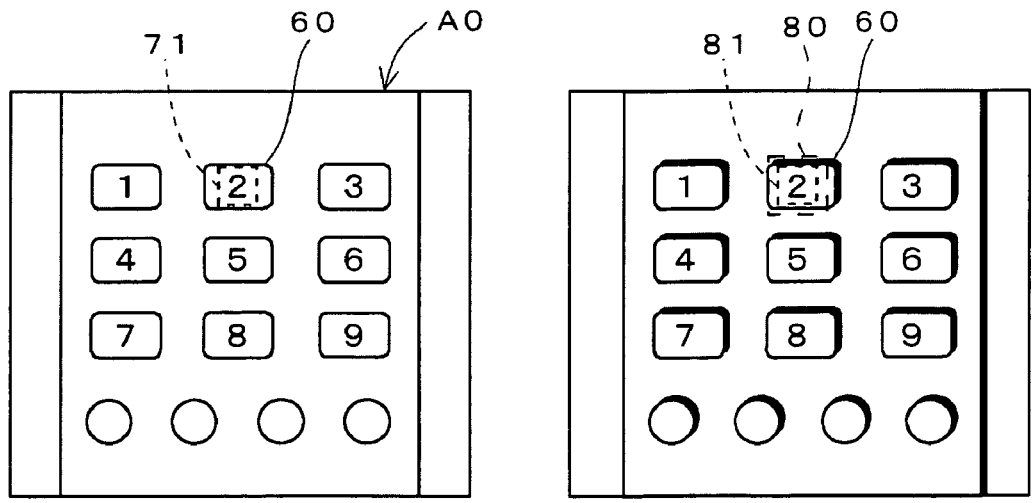
FIG. 15 is an explanatory view showing an example in which the region to be examined and the search region are set for the image in time of the examination.

When the point corresponding to the characteristic point defined on the model is specified as the representing point on the reference image A0, the corresponding point on the model may be similarly specified in ST36. In ST35, the model is converted to a shape assumed to be imaged by the slanted camera C1 using the homographic matrix corresponding to the predetermined height (e.g., standard height of when the work is normal) within the specified height range, and the range to the measured is specified using the converted model. On the other hand, the slant image A1 may be converted to the front image, and the region that matches the model may be specified on the converted image FIG. 15 shows the region to be measured 71 specified in relation to the key 60 on the front image A0, the search region 80 on the slant image A1 side set based on the position and the size of the region 71, and the region to be measured 81 specified in the search region 80 in the examination.

Only the examination by the three dimensional measurement process is performed in the procedures shown in FIG. 14, but the examination of the printed state of the character of each key and the like may be performed by the two dimensional measurement process using the front image A0 in the relevant examination.

Figure 16:
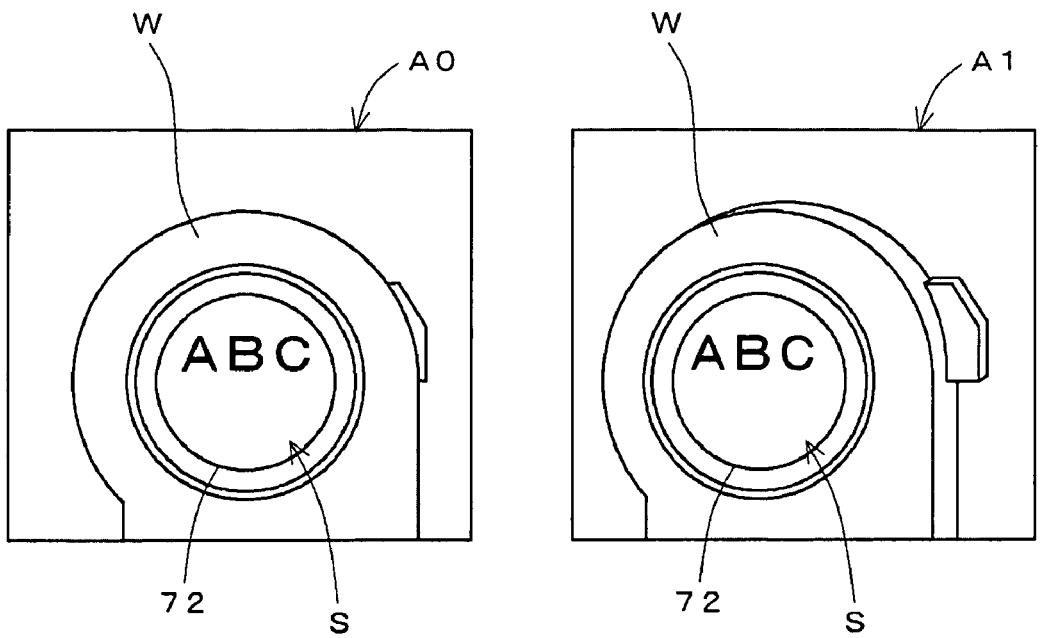
FIG. 16 is an explanatory view showing a front image and a slant image related to the work having a circular display region.

A case of examining the adequacy of the height within the display region will now be described for the work having a circular display region at the center part. In this examination, a method of extracting a part of the front image A0 as the model image for each photographing, and searching for the part that matches the model image in the slant image A1 is used. FIG. 16 shows the images A0, A1 of the work W generated by each camera C0, C1. In the figure, S is the displayed (printed) region of the character serving as the examining object. The front image of the work W is shown on the front image A0, and the border line 72 of the display region S is also circular. However, the shape of the border line 72 of the display region S, the arrangement state of the character within the display region S and the like are distorted on the slant image A1.

Prior to the examination, the non-defective model of the work W or the setting object is imaged, and the diameter of the display region S or the region to be measured on the obtained front image A0 is specified by the user. In the image processing part 22, the process of obtaining the position of the center point of the display region S from the front image A0 is executed, and the relative position of the region to be measured with respect to the center point is registered in the registration memory. This process is equivalent to the user setting the position to be measured using the setting image, which is the front image obtained based on the image for the setting object photographed with the first camera.

Figure 17:
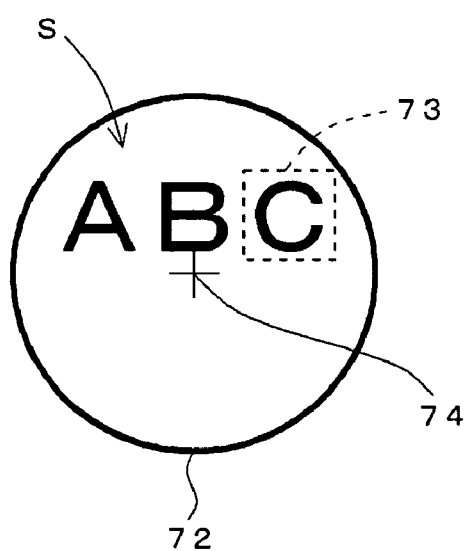
FIG. 17 is an explanatory view showing the specified result of the display region and the region to be measured with respect to the non-defective work.

FIG. 17 shows the display region S in the front image A0 in an enlarged manner. In the figure, 73 is the region to be measured specified by the user, and 74 is the center point of the display region S. The position of the center point 74 is obtained by executing the process of extracting the circular pattern from the front image A0, and specifying the border line 72 that best matches the circle (position correcting model) of the size specified by the user from the extraction result.

Figure 18:
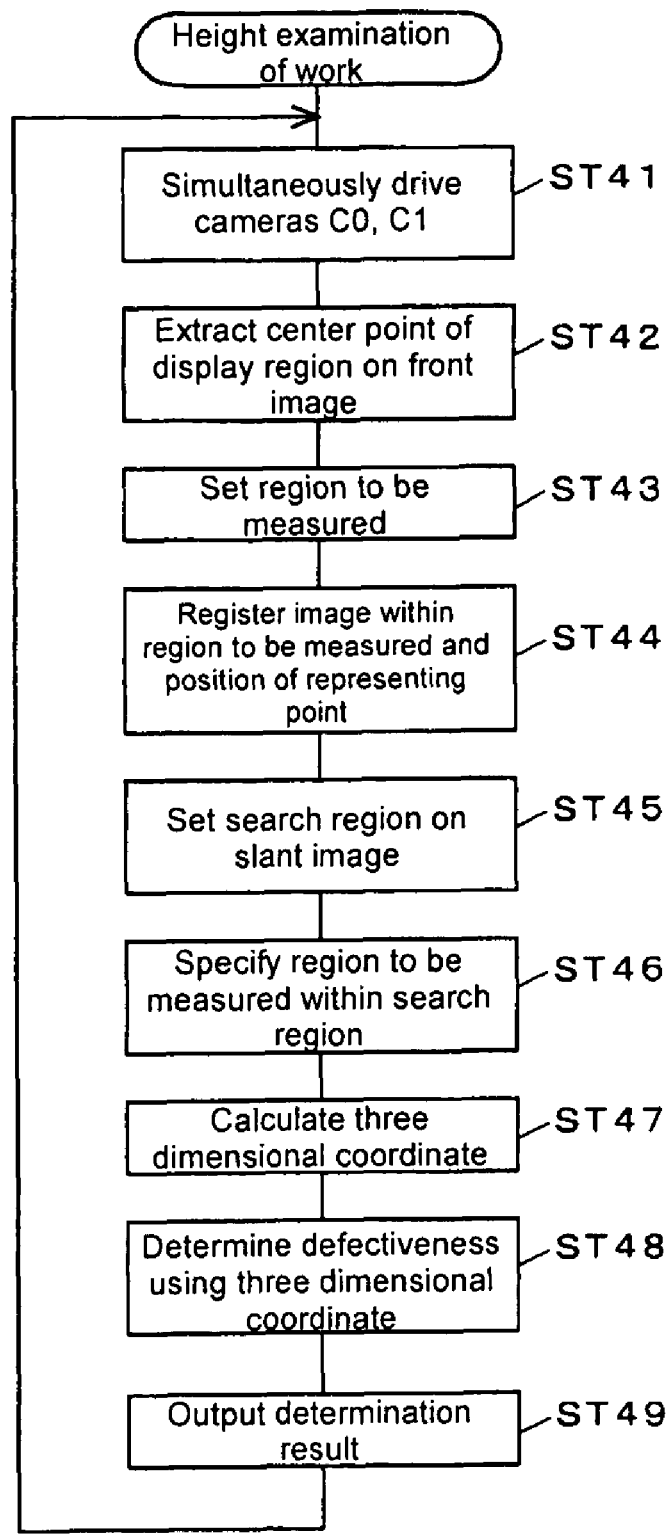
FIG. 18 is a flow chart illustrating the procedures for performing the height examination of the work of FIG. 16.

FIG. 18 illustrates the procedures of the height examination with respect to the work W of FIG. 16. In ST41, each camera C0, C1 is simultaneously driven, and the front image A0 and the slant image A1 are generated. In ST42, the position of the center point 74 of the display region S is obtained through the above described processes from the front image A0.

In ST43, the region to be measured 73 is set based on the relative position registered in advance with the coordinate of the center point 74 obtained in ST42 as the reference. In the subsequent ST44, the image of the region to be measured 73 is registered as the search model image, and the position of the representing point (e.g., position of center point within the region) of the region to be measured 73 is registered. This is equivalent to specifying the position on the object based on the setting performed using the setting image.

In ST45, the search region 82 (shown in FIG. 19) is set on the slant image A1. The position and the size of the search region 82 are determined by substituting the coordinate of the representing point registered in ST44 to equation (1), and executing equation (1) using the homographic matrix HZ corresponding to the upper limit and the lower limit of the height range specified in advance.

In ST46, the correlation matching process is executed in the search region 82 using the model image registered in ST44. The region that most resembles the registered image is specified, and is assumed as the region to be measured on the slant image A1 side. In ST47, the coordinate of the representing point is obtained for the region to be measured on the slant image A1 side, and the three dimensional coordinate is calculated using the relevant coordinate and the coordinate of the representing point on the front image A0 side. In the subsequent ST48, the adequacy of the obtained Z coordinate is determined. The determination result is output in ST49, and thereafter, the process is terminated.

Figure 19:
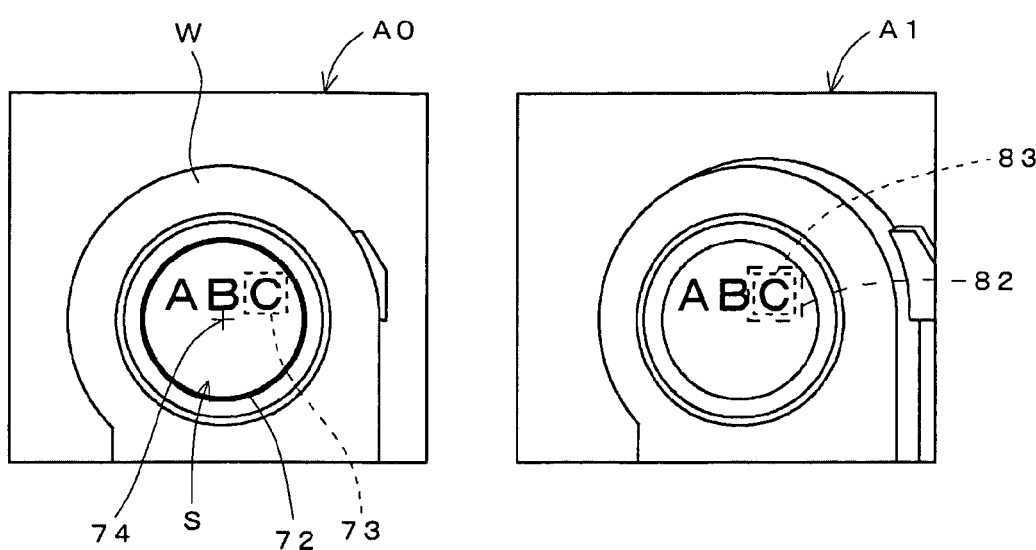
FIG. 19 is an explanatory view showing an example in which the region to be measured and the search region follow the change in the position of the work.
Figure 19:
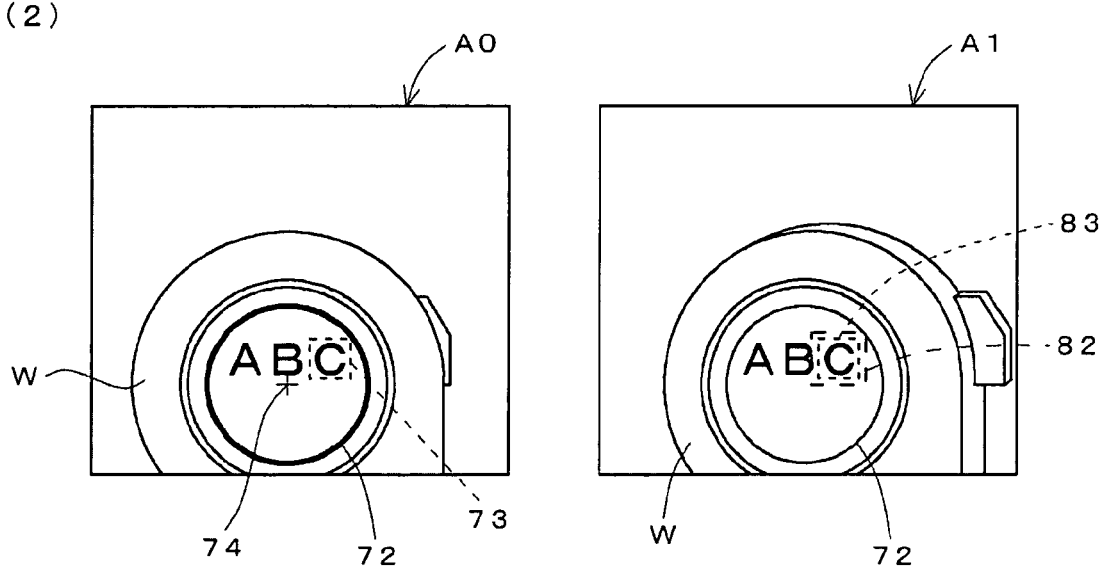

FIGS. 19(1) and 19(2) show the region to be measured 73 in the front image A0 as well as the search region 82 and the region to be measured 83 in the slant image A1 for one set of front image A0 and slant image A1. In the front image A0, the border line 72 of the display region S is shown with a thick line, and the obtained position of the center point 74 of the display region S is shown. The position of the work W differs between the image of (1) and the image of (2) in FIG. 19, but in either case, the region to be measured 73 is properly set so that the target character can be fitted therein.

According to the procedures of the examination illustrated in FIG. 18, the extraction process of the center point 74 and the positional adjustment process of the region 73 are performed using the front image A0, and thus the distortion of the image does not need to be taken into consideration, and the region to be measured 73 can be set at an appropriate position by the relative positional relationship with respect to the center point 74. In the example of FIG. 19 as well, the position of the work W differs between the image of the example of (1) and the image of the example of (2), but the region to be measured 73 is set with the same conditions. Furthermore, according to the procedures of the examination shown in FIG. 18, since the search model image is acquired from the work W for each work W to be examined, the three dimensional measurement can be performed by applying the same procedure even if the surface pattern such as character, which is the target of three dimensional measurement, differs for each work W. The surface pattern differs for each work W in this example, but the region to be measured is set using the fact that the shape of the work W and the position of the region to be measured having the shape of the work W as the reference are common to all works W.

In the procedures of FIG. 18 as well, the registered search model image may be converted to the shape assumed to be imaged by the slanted camera C1 using the homographic matrix Hz, and the region to be measured 83 may be specified using the converted image. On the contrary, the slant image A1 may be converted to the front image, and the region to be measured 83 that matches the model may be specified on the converted image. Furthermore, the process of examining the printed state of the character within the display region S using the front image A0 may be included in the procedures of FIG. 18.

In the above described examining device, one camera C0 is arranged with the optical axis directed in the vertical direction to generate the front image, but even if the optical axis of such camera C0 is set in a slanted manner, the front image can be obtained by converting the image generated in the camera C0.

Figure 20:
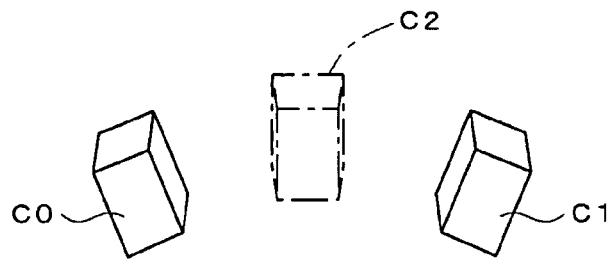
FIG. 20 is an explanatory view showing an example of setting a virtual camera for front view.
Figure 20:
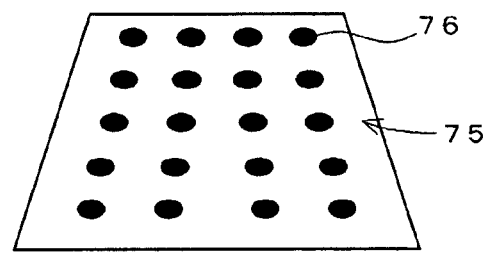

FIG. 20 shows a calibration method for performing the converting process. In this method, a calibration work 75 is installed on a plan of an arbitrary height parallel to the mounting surface of the work W, and the cameras C0, C1 are arranged so as to image the calibration work 75 from diagonally above. In this example, the planar work having a configuration in which a plurality of circular patterns 76 are arranged on the upper surface at equidistant is used as the calibration work 75.

Figure 21:
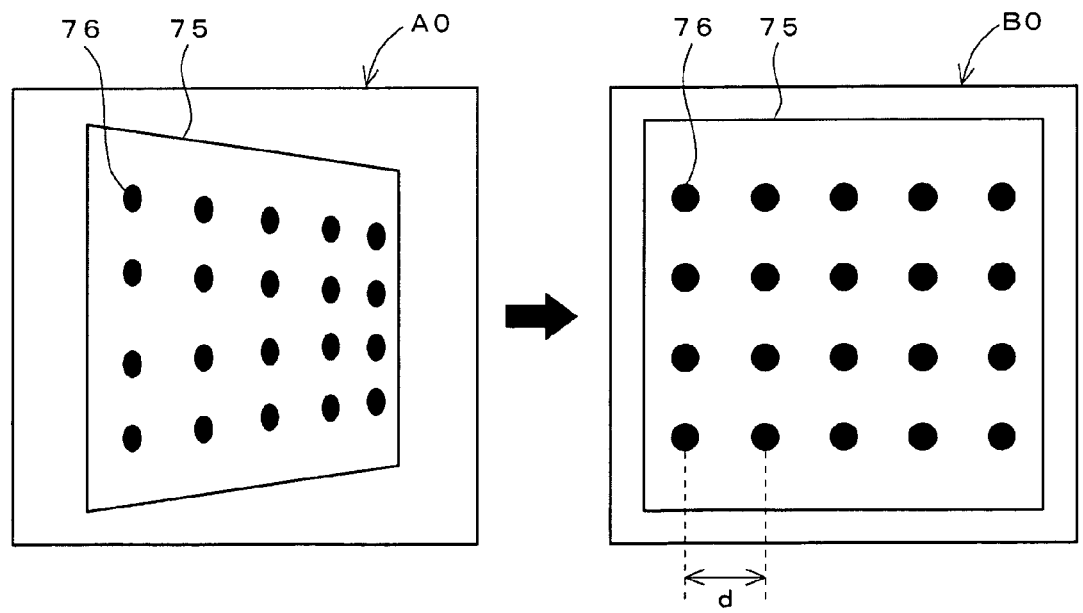
FIG. 21 is an explanatory view showing a method of converting a slant image to a front image.

In the calibration process, the virtual camera C2 arranged with the optical axis directed in the vertical direction is assumed, and the virtual image obtained when imaging the calibration work 75 with the camera C2 is assumed. As shown in FIG. 21, the homographic matrix for converting the image A0 generated by the camera C0 to the image B0 by the camera C2 is obtained. To this end, the center coordinate of each circular pattern is obtained in the images A0 and B0. With regards to the image A0, the coordinate (barycenter coordinate etc.) of the center of the circular pattern that is distorted to an ellipse from the actual image is obtained. With regards to the image B0, an arbitrary imaging magnification is set to the virtual camera C2, and the actual distance of the circular patterns on the calibration work 75 is converted to the distance d on the image using the magnification set in the virtual camera C2 to calculate the coordinate of the center of the circular pattern on the image. The combination of the center position of the corresponding circle is specified between the images A0, B0 based on the array order of each circular pattern, and the homographic matrix is obtained through least squares method using the coordinate of the center of the circles.

According to the camera arrangement of FIG. 20, the height of the site to be imaged in the optical axis direction of the virtual camera C2 for obtaining a front view with respect to the work W becomes the "front height." The front height is expressed with the arbitrary plane (e.g., mounting surface of work W) orthogonal to the optical axis direction of the camera C2 as the reference. The plane of reference is generally a horizontal plane, but is not limited thereto, and a plane or a vertical plane slanted with respect to the horizontal plane may be the reference plane.

After the homographic matrix is defined by the calibration process, the front image which scale is known is generated by the converting process using the image A0 from the camera C0 with respect to the plane at the same front height as the calibration work 75.

The front image may obviously be obtained by the same conversion calculation even when the plane parallel to the calibration work 75 but has different front height from the calibration work 75 is the imaging target. However, compared to the front image of when the plane at the same front height as the calibration work 75 is converted, the image is converted to an enlarged front image if the plane to be imaged is positioned closer to the camera C2 than the calibration work 75. If the plane to be imaged is positioned farther away than the calibration work 75 when viewed from the camera C2, the image is converted to the front image that is reduced compared to when the plane to be imaged is at the same front height as the calibration work 75.

Therefore, the degree of enlargement or reduction of the image when converted to the front image can be obtained with calculation if the front height of the plane to be imaged is known. Thus, the dimensional measurement may be performed on the converted front image for the plane to be imaged which front height is known.

The examining device in which the cameras C0, C1 are arranged in a slanted manner as in FIG. 20 will now be described. The entire block configuration is the same as that shown in FIG. 3, but a function (conversion means) for performing the conversion calculation of converting the slant view generated by the camera C0 to the front image is set in the computer serving as the calculation processing unit 20. The factors for determining the size of when the front image obtained through conversion (hereinafter referred to as front converted image) is displayed on the screen of the monitor 3 includes virtual imaging magnification and display magnification. The front converted image for the work W for setting is equivalent to the setting image, and the front converted image for the work W to be measured is equivalent to the first image.

The virtual imaging magnification is the ratio between the actual distance of the two points on the work W at the same front height and the distance between the relevant two points imaged on the virtual imaging surface of the virtual camera C2, and is represented by the distance on the virtual imaging surface of when the actual distance is 1. The virtual imaging magnification changes depending on the front height of the imaging target so as to become smaller as the imaging target becomes farther away from the virtual camera C2. The virtual imaging magnification may be changed by adjusting the parameters of the front conversion calculation assuming that the focal length of the virtual camera C2 has been changed, but the focal length of the virtual camera C2 is assumed to be fixed herein.

The display magnification is the ratio between the distance of two points on the virtual imaging surface and the distance of the relevant two points displayed on the monitor. The display magnification may be changed by performing the calculation of enlarging or reducing the image. The display magnification does not influence the scale used in measurement, and also does not influence the ratio between the size of the scale figure to be hereinafter described and the size of the front converted image, and thus an appropriate value can be selected so as to easily observe the image on the display screen. For example, if the display magnification of the front converted image is selected so that the size of the image of the work barely changes between the slant image photographed with the camera C0 and the front converted image, the image content is easily understood when the display content is switched from one image to the other.

As described above, the virtual imaging magnification used in calibration can be applied as it is for the plane at the same front height as the calibration work 75. If the front height is specified, the virtual imaging magnification corresponding thereto can be calculated through calculation. If the virtual imaging magnification is known, the dimensional measurement for the location to be measured at the relevant front height can be properly performed using the front converted image. The front height that serves as the assumption of the dimensional measurement and the virtual imaging magnification is referred to as scale reference height. That is, the scale reference height is the front height of the location to be measured assumed when obtaining the actual dimension of the location to be measured from the dimension in the front converted image.

The information associating the dimension in the front converted image and the actual dimension of the location to be measured is referred to as scale information. For example, the actual dimension corresponding to one pixel of the front converted image is set as the scale information. The scale reference height and the scale information must by consistent with respect to each other, and thus is in a relationship where if one is changed, the other must be changed.

Figure 22:
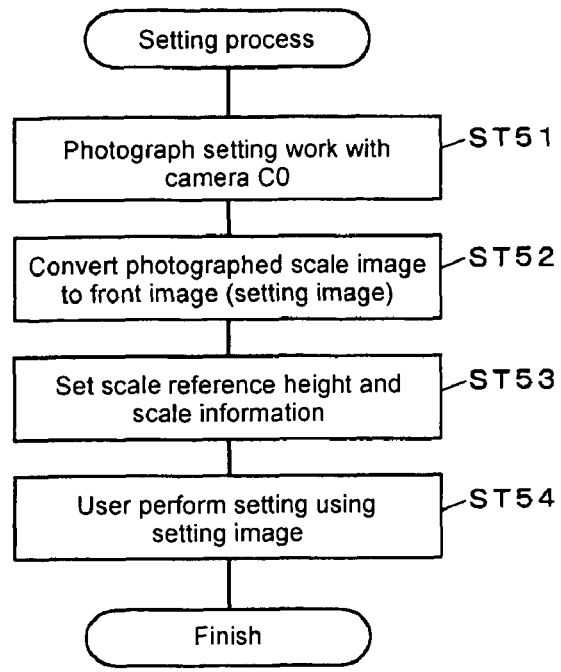
FIG. 22 is a flow chart illustrating the procedures of a setting performed prior to the examination.

FIG. 22 shows the procedures of a setting processed performed prior to the examination. First, in ST51, the work W for setting (object for setting) is photographed with the camera C0. Next, in ST52, the photographed slant image is converted to the front image. The calculation processing unit 20, on which the conversion calculation program operates, serves as a conversion means. This is the same for the conversion from the slant image to the front image in the examination to be hereinafter descried. The front converted image obtained through the conversion process is used as the setting image.

In ST53, the scale reference height and the scale information are set. Specifically, with regards to the front height of the site to be measured of the setting work, the input of the user is accepted, and the input value is assumed as the scale reference height. The scale information is calculated from the scale reference height, and the scale reference height and the scale information are stored in the calculation processing unit 20.

In ST54, the setting necessary for the measurement process is made by the user using the setting image. The example of a specific setting content is the same as those performed for the lead examination, character key examination, and work height examination of when the camera C0 is arranged at front view. Which processes to perform at which order in time of measurement may also be set.

In ST53, the dimension representing the height of the location to be measured with respect to the mounting surface of the work W and the like is input as the scale reference height. The values of the front height or the scale reference height do not necessarily need to be expressed with the mounting surface of the work W as the reference inside the device, and may be expressed as the value of the Z coordinate in the coordinate system of FIG. 10 and the like. Alternatively, the height may be expressed by other arbitrary coordinate system in which the coordinate conversion is possible with respect to each other.

However, the scale reference height input by the user is preferably the height naturally recognized by the user as the height of the location to be measured. By having the height of the location to be measured with the mounting surface of the work W as the reference as the scale reference height, the user who does not understand the details of the inner process of the device can easily understand which dimension is required to be input as the scale reference height.

However, the step of ST35 may be omitted, and instead, some kind of default such as the front height of the calibration work 75 may be used as the scale reference height. Generally, the virtual imaging magnification tends to have a small value. In such case, the error of the scale is relatively small even if the front height of the location to be measured and the scale reference height are different. Therefore, if high precision measurement of the dimension and the area are not required, for example, when performing the two dimensional image processing for the purpose of determining the presence of dirt, detecting crack at the outer border line, determining the type of character and the like, the scale reference height does not need to be input each time according to the difference in the front height of the location to be examined, and trouble does not occur even if the default is used as the scale reference height. Furthermore, when specifying the position to be measured for the three dimensional measurement, trouble does not occur even if the default is similarly used as the scale reference height.

Figure 23:
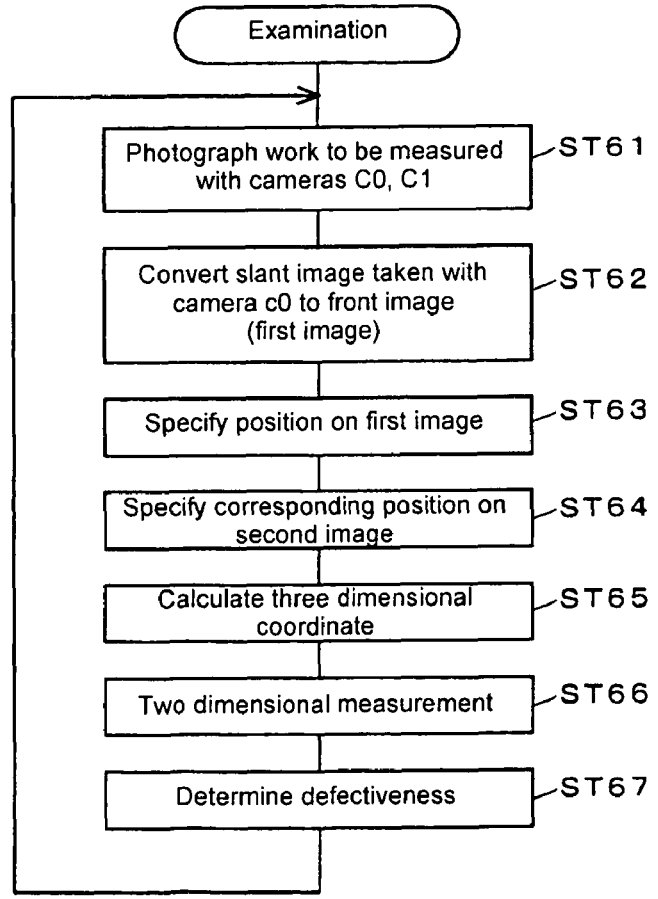
FIG. 23 is a flow chart illustrating one example of the procedures of the examination involving conversion process to the front image.

FIG. 23 illustrates one example of the procedures of the examination executed after the setting process is finished. First, in ST61, the work (object to be measured) W is photographed with the cameras C0 and C1 according to the detection signal from the work detection sensor. In ST62, the slant image photographed with the camera C0 is converted to the front image to obtain the first image. In ST63, the position to be performed with three dimensional measurement is specified on the first image. The example of the method of specifying the position is similar to those described above for various examinations where the camera C0 is arranged in front view. In ST64, the position corresponding to the previously specified position on the first image is specified on the second image photographed with the camera C1.

In ST65, the position on the first image and the position on the second image that have been specified are used to calculate the three dimensional coordinate. In ST66, the two dimensional measurement is performed using the first image. Since the first image is the front converted image, various two dimensional image processing methods conventionally developed on the assumption that the front image is the processing target can be applied. In the case of performing the two dimensional measurement involving the measurement of the dimension or the area, the scale information set in the setting process of FIG. 22 is used. The calculation processing unit 20, on which the two dimensional measurement program operates, serves as a two dimensional image processing means. After the measurement of ST66 is finished, the determination process for defectiveness of the measurement results obtained in ST65, 66 is executed in ST67. Thereafter, the process returns to ST61 and waits for the next work W.

ST63 to ST66 of FIG. 23 correspond to the steps for the measurement process, but the processing content and the order of such steps may take various settings. For example, the three dimensional measurement may be performed on a plurality of points. In this case, a plurality of positions are specified in ST63 and ST64, and the three dimensional coordinate of the plurality of points may be calculated in ST65, or steps ST63 to ST65 of specifying the position and calculating the three dimensional coordinate for one point may be repeated over a plurality of times to calculate the three dimensional coordinate one location at a time for each repetition. Any number of types may be set for the two dimensional measurement of ST66, and the two dimensional measurement may be executed at any timing if after ST62.

Figure 24:
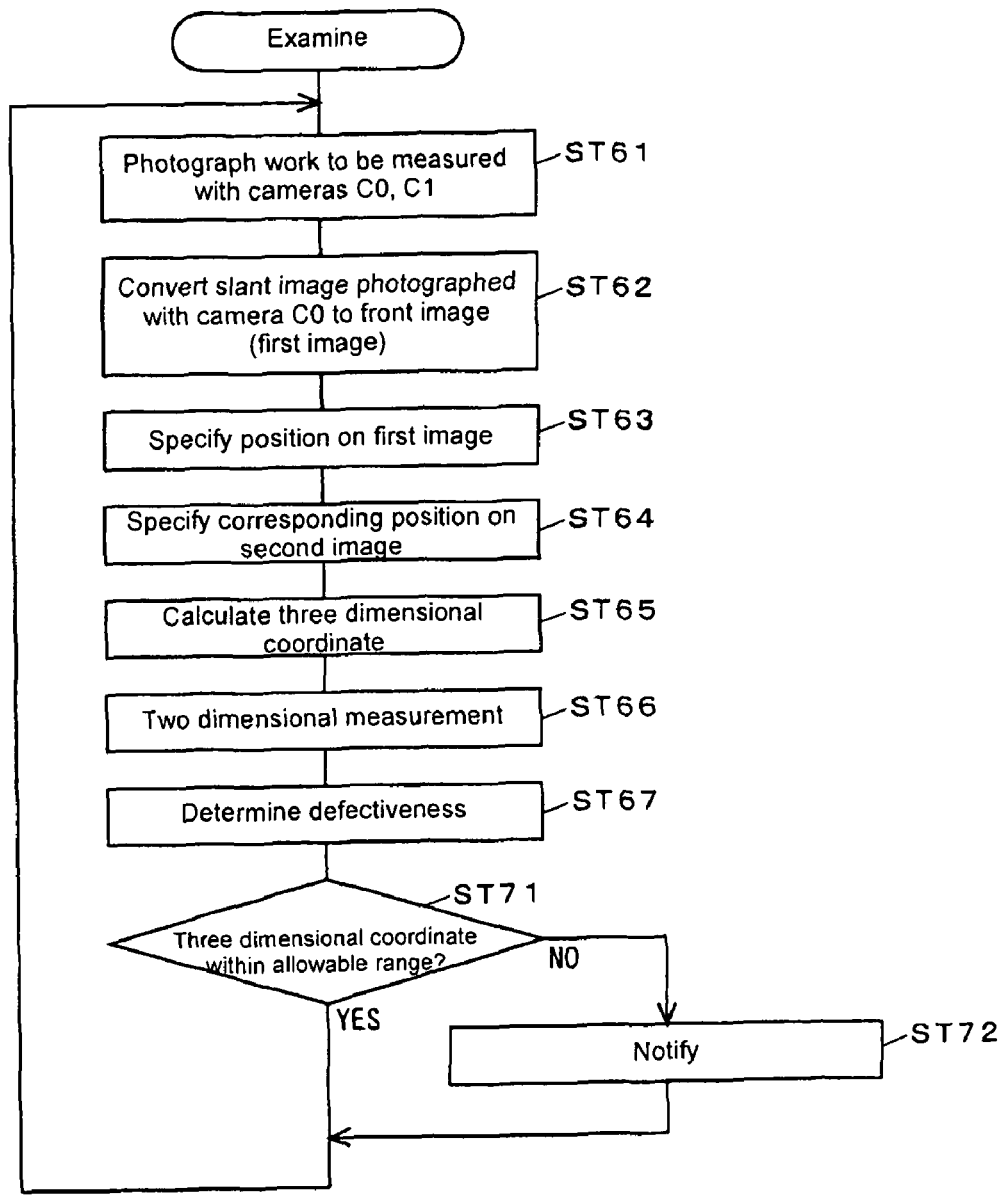
FIG. 24 is a flow chart illustrating one example of the procedures of the examination involving conversion process to the front image.

FIG. 24 is another example of the procedures of the examination. In performing this examination, the allowable range of the front height is assumed to be set by the user in ST54 of FIG. 22, and stored in the calculation processing unit 20. The allowable range of the front height is defined so as to include the scale reference height in the range. The allowable range of the front height is defined from the standpoint that if the front height of the location to be measured is within the range, the error of the scale of the front converted image is within the assumed range, and is different from the reference for determining the defectiveness of the work W.

ST61 to ST67 have contents same as the processes of the same reference characters in FIG. 23. The process of ST71 determines whether or not the front height shown by the three dimensional coordinate calculated in ST65 is in the set allowable range. The calculation processing unit 20, on where the program for performing the determination operates, serves as the determining means.

If the calculated three dimensional coordinate is not within the allowable range of the front height, the process returns to ST61 through the notifying process of ST72, and if within the allowable range, the process returns to ST61 without performing the notifying process. When proceeding to ST72, notification is made in that a difference greater than the assumed extent exists between the scale indicated by the scale information used in the two dimensional measurement and the actual scale of the first image. For example, the notification is displayed, or a warning is issued. Other examples of notification includes attaching the display that the error produced by performing the process based on the first image having scale error is contained in the measured value to the display of the two dimensional measurement result.

Figure 25:
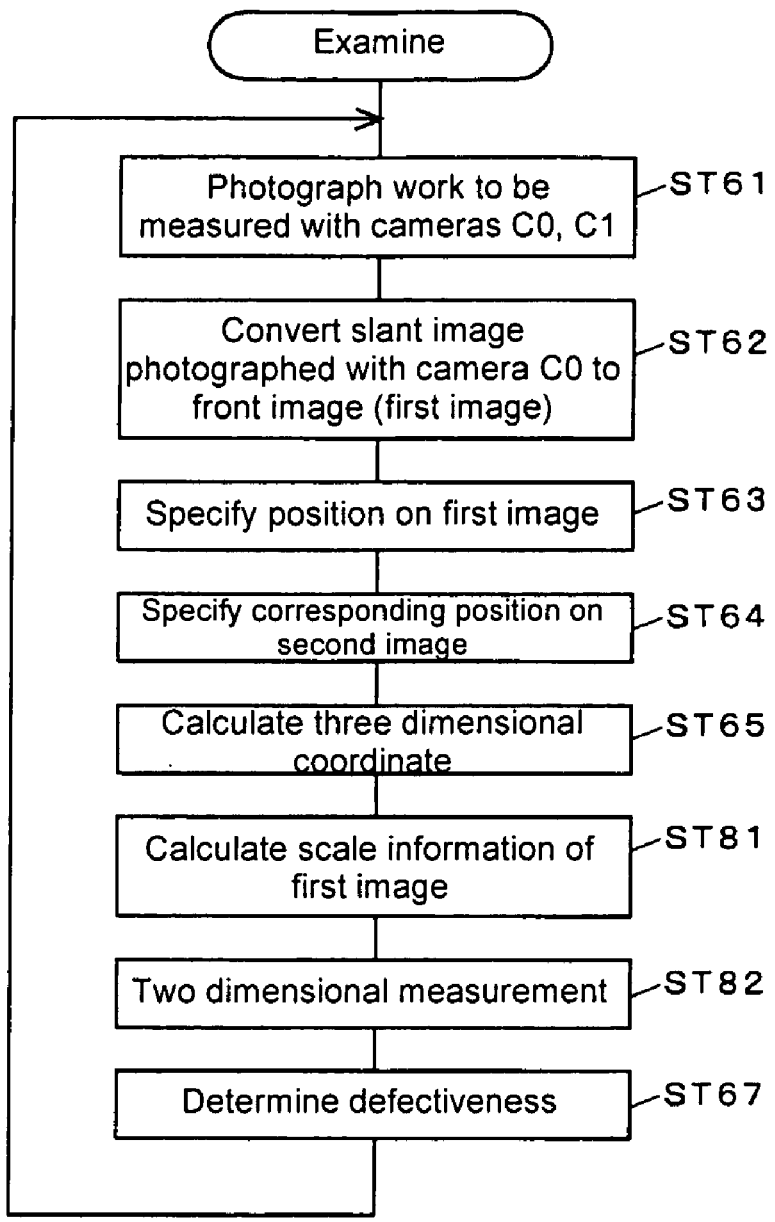
FIG. 25 is a flow chart illustrating one example of the procedures of the examination involving conversion process to the front image.

FIG. 25 is another further example of the procedures of the examination. The processing content of ST61 to ST65 and ST67 has the same content as the processes of the same reference character in FIG. 23. In ST81, the scale information of the first image is calculated with the front height indicated by the three dimensional coordinate obtained in ST65 as the scale reference height. The calculation processing unit 20, on where the program for performing the calculation of the scale information is operates, serves as the scale information calculating means. In ST82, the two dimensional measurement for the first image is performed using the calculated scale information.

Figure 26:
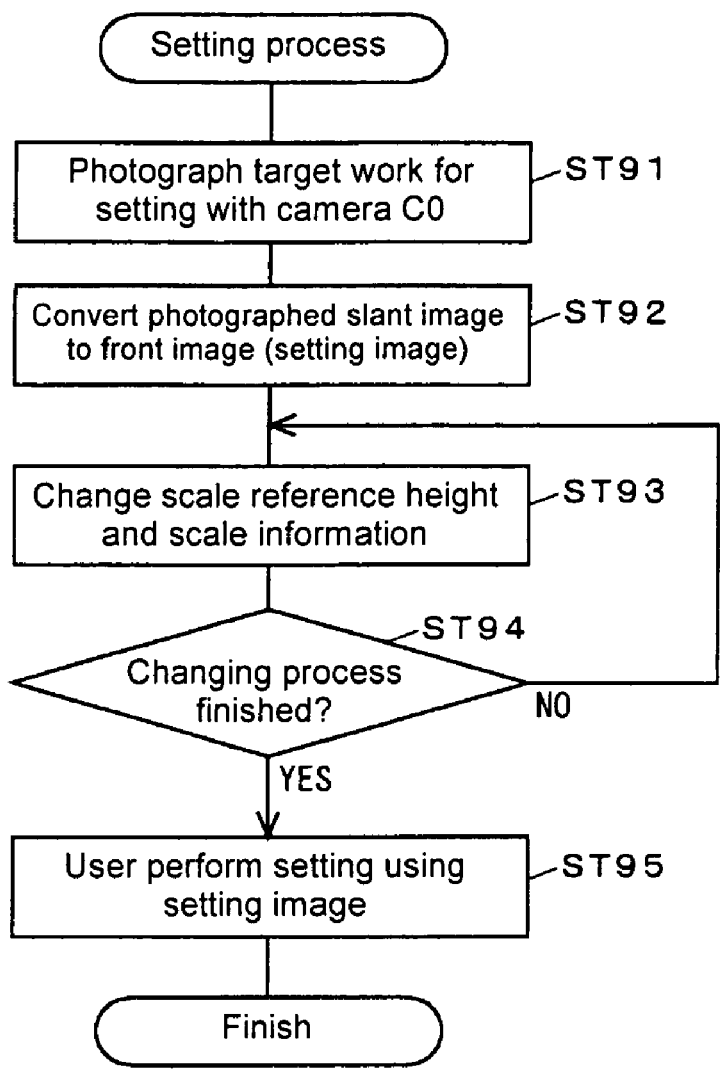
FIG. 26 is a flow chart illustrating the procedures of a setting including changing the scale reference height and the scale information.

FIG. 26 shows the procedure of the setting process shown in FIG. 22 that has been modified so that the user can adjust the set value while checking the adequacy of the setting of the scale reference height and the scale information. In this procedure, the picture of the setting work W is first photographed with the camera C0 in ST91. In ST92, the photographed slant image is converted to the front image. The obtained front converted image is used as the set image. The monitor 3 at this point displays a setting window 90 (shown in FIG. 28) including the front converted image and the original image before conversion.

The details will be hereinafter described, but at this stage, the front height of the calibration work 75 input in time of calibration is set as the initial value of the scale reference height. Next, in ST94, the user performs the operation of changing the value of the scale reference height using the setting window 90, wherefore the scale reference height and the scale information are changed according to the operation. This changing operation is repeatedly executed until the user decides that the scale reference height is appropriate. After the changing process is finished, the process proceeds to ST95, and the user performs the setting necessary for the measurement process using the setting image, similar to ST54 of FIG. 22.

Figure 27:
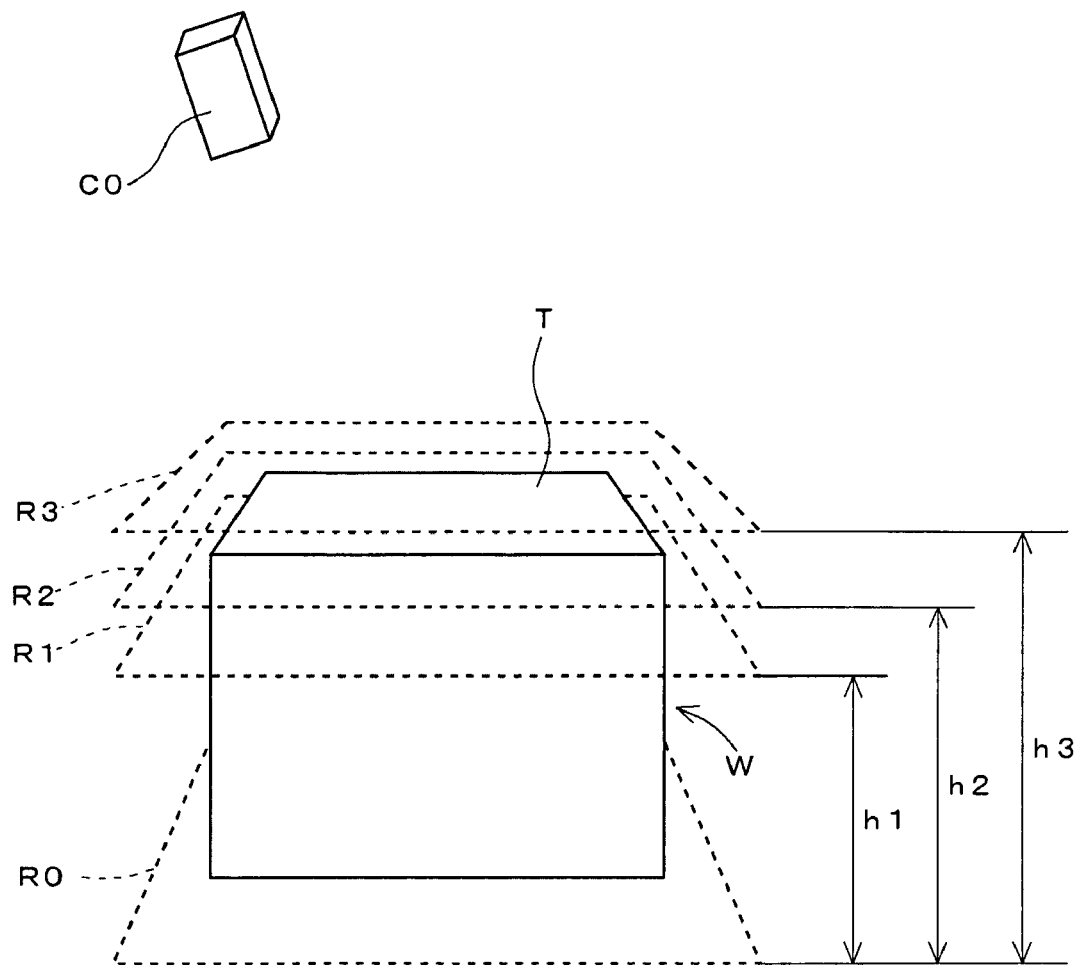
FIG. 27 is an explanatory view showing a photographing state of the work by a slanted camera.

FIG. 27 shows the photographing situation of the setting work W by the camera C0 in the above described setting process (camera C1 is also arranged but is not shown). The setting work W is assumed as non-defective that has been selected from the work W to be measured. The entire shape of the work W is a cube. The reference character T indicates the upper surface of the work W. FIG. 27 shows virtual planes R0, R1, R2, and R3. R0 is the mounting surface of the work W, and is for example, the surface of the belt conveyor where the work W is mounted. The planes R1, R2, and R3 are parallel to R0 and the respective height from the R0 is h1, h2, h3 (h1<h2<h3), where the height h2 of the plane R2 matches the height of the upper surface T of the work W. The calibration is performed with the calibration work 75 placed at the height of the plane R1, and the height h1 of the plane R1 is set as the initial value of the scale reference height.

Figure 28:
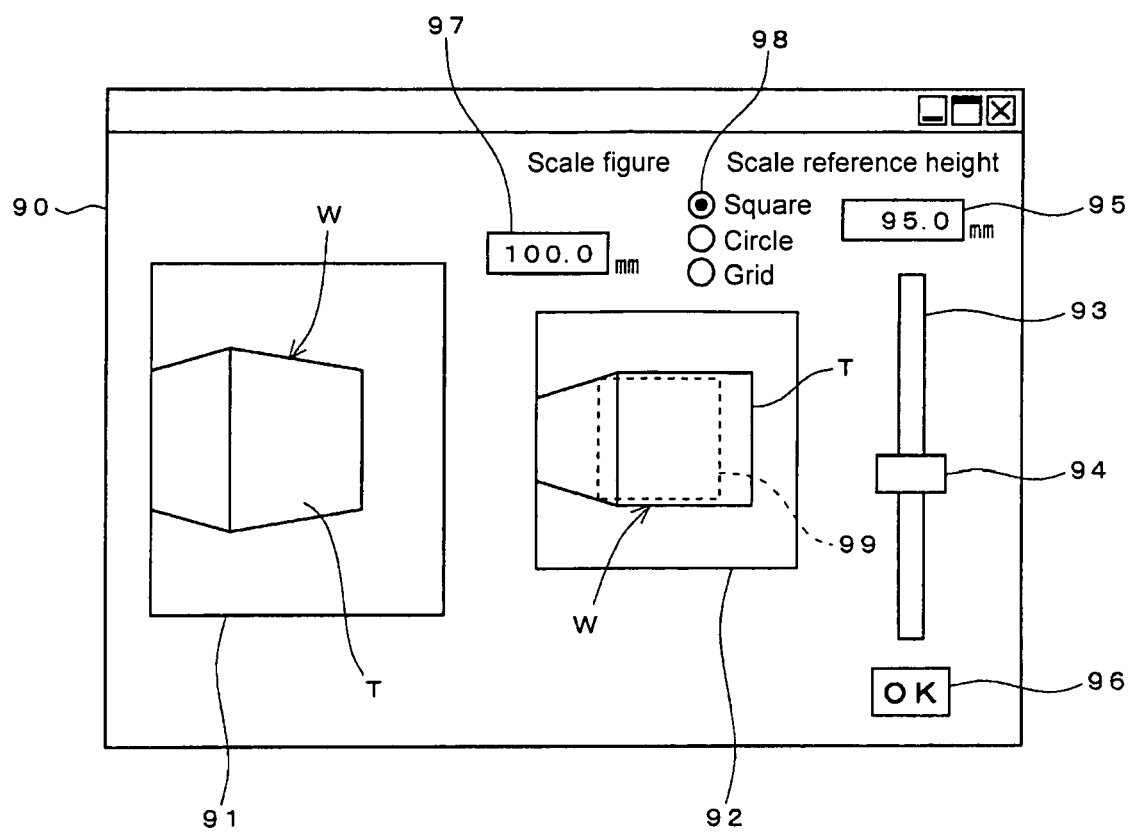
FIG. 28 is an explanatory view showing the content of a window displayed on the monitor.

FIG. 28 shows the content of the setting window 90 displayed on the monitor 3 under the imaging state of FIG. 27. The image 91 of the setting work W photographed with the camera C0, the editing image 92, the adjustment bar 93 and adjustment handle 94 for the scale reference height, the numerical value display portion 95 for scale reference height, a confirmation button 96 for scale reference height, a dimension input portion 97 for scale figure, and a type selecting portion 98 for scale figure are displayed on the window 90. In addition to the front converted image of the work W, the scale FIG. 99 is also displayed in the editing image 92. The calculation processing unit 20, on where the program for creating the content of the editing image 92 operates, serves as an image editing means.

In the image 91 photographed with the camera C0, the upper surface T of the work W is displayed as a trapezoid, but is converted to the original square and displayed in the editing image 92. However, since the initial value of the scale reference height is set to h1 of the front height the calibration work 75, but the front height of the actual upper surface T is h2, an error occurs in the scale of the upper surface T that is converted and displayed. That is, the upper surface T is displayed greater than when at the scale reference height.

The scale FIG. 99 is a figure showing the actual dimension on the plane at the scale reference height on the display screen of the monitor 3 based on the virtual imaging magnification at the scale reference height. The types of scale FIG. 99 may be any one of square, circle, or grid as selected in the selecting portion 98. The dimension input to the dimension input portion 97 refers to the length of one side for a square, the diameter for a circle and the distance between the grid lines for a grid. The scale FIG. 99 can be moved to an arbitrary position within the edit image 92 by the drag operation to facilitate the comparison with the front converted image of the work W.

The figure that can be easily compared with the shape of the upper surface T of the work W is selected as the scale image 99 (square which is the same shape as the upper surface T is selected in this example), and the value suited for comparison with the size of the upper surface T of the work W is input to the dimension input portion 97 (dimension same as the length of the side of the upper surface T is input in this example), so that the size of the upper surface T recognized in comparison with the scale FIG. 99 becomes greater than the actual size if the actual height of the upper surface T (location to be measured) of the work W is higher than the scale reference height (close to virtual camera C2), and becomes smaller than the actual size in the reverse case.

Therefore, if the size of the location to be measured of the setting work W is known, the scale image 99 that can be easily compared with the shape of the work W observed on the monitor 3 is selected, and the value suited for comparison with the known size of the location to be measured is set for the dimension, the scale reference height matches the front height of the location to be measured of the work W (upper surface T) if the ratio between the size of the location to be measured in the front converted image of the work W and the size of the scale FIG. 99 is correct.

When executing ST93 first in FIG. 26, after calculating the initial value of the scale information from the initial value of the scale reference height, the scale FIG. 99 selected by the user is displayed on the editing image 92 at the dimension input to the dimension input portion 97 and the size corresponding to the initial value of the scale information, and the adjustment of the scale reference height is performed by the user. For each adjustment, the scale information is calculated from the adjusted scale reference height, and the size of the scale FIG. 99 is changed based on the calculation result.

The scale reference height is adjusted by drag operating the adjustment handle 94 along the adjustment bar 93. The adjustment reference height at a relevant point is displayed on the numerical value display portion 95 for the scale reference height. After the adjustment of the scale reference height is finished, the confirmation button 96 is pushed and the process proceeding from ST94 to ST95 of FIG. 26 is performed. The scale information is also confirmed at this point. The scale reference height and the scale information are thus consistently changed. The calculation processing unit 20, on where the program for performing a series of processes operates, serves as an adjustment means.

Figure 29:
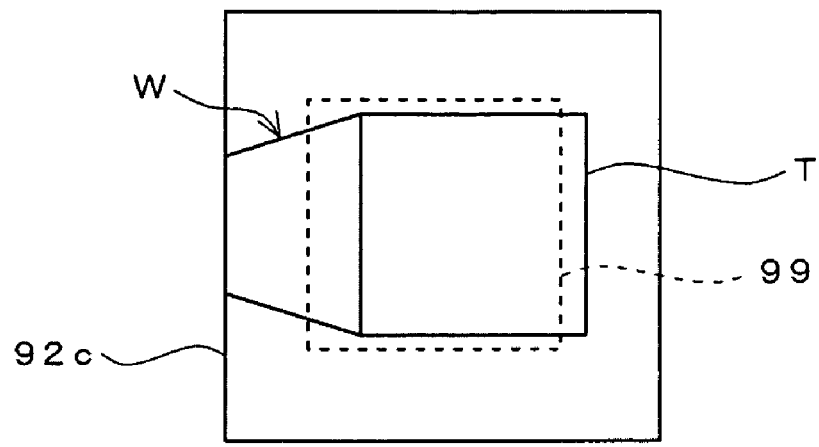
FIG. 29 is an explanatory view showing the change in the display content of an editing image involved in changing the scale reference height.
Figure 29:
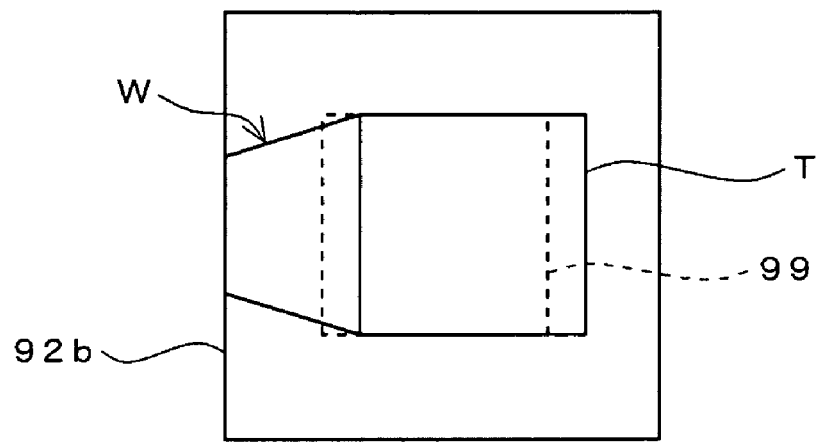
Figure 29:
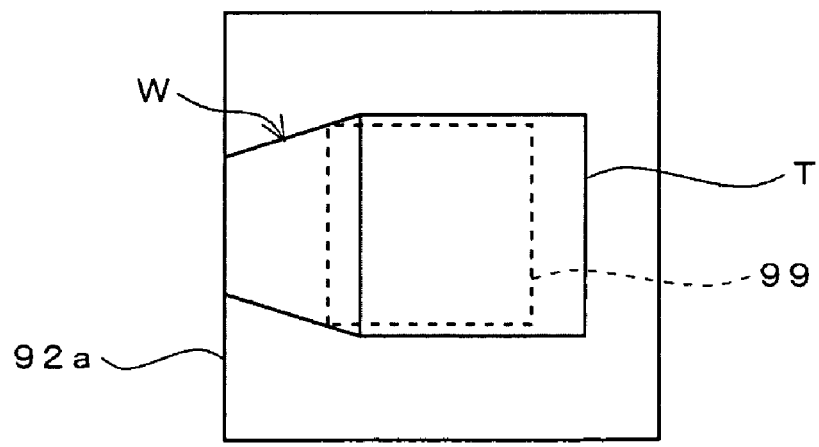

FIG. 29 shows the change in the display content involved in the change in the scale reference height with respect to the editing image 92 shown in FIG. 28. The editing image 92a is of when the scale reference height is assumed as h1 or the initial value. Assuming the upper surface T is a square having one side of 100 mm, the square having one side of 100 mm is shown as the scale FIG. 99. The scale FIG. 99 displayed in this case is equivalent to a figure that is expected to be displayed when the square having one side of 100 mm is at the scale reference height (height h1), and such square is photographed and then front converted. Since the actual upper surface T is at h2, the square is displayed larger than the scale FIG. 99.

When the scale reference height h2 is adjusted, the editing image in which the size of the upper surface T and the size of the scale figure match is obtained as shown in the editing image 92b. Furthermore, if the scale reference height is increased to h3, the scale FIG. 99 is displayed larger than the front converted image of the upper surface T, as shown in the editing image 92c.

Through the above operations, the user may judge that the set value matches the front height of the upper surface T when the scale reference height is set at h2. The sizes can be more accurately compared by overlapping the scale FIG. 99 on the front converted image of the upper surface T through the drag operation.

Therefore, the user adjusts the scale reference height until the ratio between the location to be measured and the scale image 99 in the editing image is at a proper state to properly match the scale reference height to the front height of the location to be measured. The scale information is thereby properly set as well.

Through the above display, the user is able to directly check on the display of the editing image 92 that the front image of the location to be measured of the setting work W and the scale reference height substantially match. If the error for the height matching is small, the corresponding position can be found even if the corresponding position searching range in the height direction on the second image is small. If the error for the height matching is small, the error in the measurement result becomes small when the two dimensional measurement including the dimensional measurement or the area measurement is performed using the first image.

The adjustment of matching the scale reference height to the front height of the location to be measured is performed while looking at the editing image 92 in the above example, but the user does not necessarily need to understand the concept of the scale reference height, and thus does not necessarily need to indicate to the user that the adjusting target is the scale reference height. For example, it may appear to the user as the adjustment of the scale of the front converted image, but may actually the adjustment of the reference height. Furthermore, the adjustment process of the scale of the front converted image may actually be performed, and the corresponding scale reference height may be calculated from the adjustment result of the scale.

For example, instead of directly adjusting the scale reference height, one of either the scale FIG. 99 or the front converted image of the work W may be enlarged or reduced or may both be enlarged or reduced at different ratio so that the ratio between the size of the location to be measured in the front converted image of the work W and the size of the scale FIG. 99 becomes correct, and the scale information may be obtained from the enlarging or reduction ratio and the corresponding scale reference height may also be calculated.

Such method of obtaining the final scale reference height while referencing the ratio of the size of the location to be measured in the front converted image of the work W and the size of the scale FIG. 99 can be utilized when setting the scale reference height while looking at the image displayed on the monitor 3 without knowing the front height of the location to be measured of the work W.

The method of obtaining one of the scale reference height or the scale information from the other is not limited to a case in which the front image converted from the slant image is the target of the two dimensional measurement, and may be applied to a case in which the front image obtained by photographing the object with the camera C0 arranged so as to acquire the front image as in FIG. 1 as the target of the two dimensional measurement. In this case as well, the advantage of easy setting is also obtained.

Evaluation on whether the value of the scale information is appropriate or not can be made by comparing the front height indicated by the result of the three dimensional measurement and the scale reference height for both when the first camera is arranged in a slanted manner and when arranged in front view. Performing the three dimensional measurement contributes to verifying the accuracy of the two dimensional measurement.

Needless to say, the method of determining whether the front height indicated by the calculated three dimensional coordinate is contained in the allowable range described with reference to FIG. 24, the method of calculating the scale information using the front height indicated by the calculated three dimensional coordinate described with reference to FIG. 25, and the method of adjusting the scale reference height based on the operation by the user described with reference to FIGS. 26 to 29 may all be applied even if the first camera C0 is arranged in the direction of the front view.

The scale reference height used in calculating the scale information from the scale reference height may use the value input by the user or may use the front height actually measured by the device itself with the work W as the target. The measurement of the front height may be measured by the three dimensional measurement function using the second camera or may arrange a front height measurement sensor and measured by the sensor. The front height measurement sensor may be any one of various well known sensors such as laser displacement measuring instrument of triangulation distance measurement method based on the projection of the laser beam and the received light of the reflected light thereof, probe contact type displacement measuring instrument etc.

The image processing device described below should also be recognized based on the above disclosure.

(A) An image processing device for performing a process using a first image or a front image obtained based on an image for an object photographed with a first camera and a second image based on an image photographed with a second camera arranged so at to photograph the object from a direction different from the direction photographed with the first camera; the image processing device including a setting means for a user to perform a setting on a position to be measured using a setting image or the front image obtained based on the image for a setting object photographed with the first camera;

a position specifying means for specifying a position on the object based on the setting with respect to the first image or the front image obtained based on the image for the object to be measured photographed with the first camera; and a three dimensional measurement means for specifying a position on the second image corresponding to the position specified on the first image and calculating a three dimensional coordinate using the specified position on the first image and the position on the second image; wherein the scale information for associating the dimension in the front image and the actual dimension of the location to be measured, and the scale reference height or a front height consistent with the scale information are available; and further including a two dimensional image processing means for performing two dimensional image process on the first image using the scale information.

(B) The image processing device of (A) where the value of the allowable range of the front height defined so as to include the scale reference height is available, and further including a determining means for determining whether or not the front height indicated by the three dimensional coordinate calculated by the three dimensional measurement means is contained in the allowable range.

(C) The image processing device of (A) further including a scale information calculating means for calculating the scale information using the front height indicated by the three dimensional coordinate calculated by the three dimensional measurement means.

(D) The image processing device of (A) further including an adjustment means for coherently changing the scale reference height and the scale information based on the operation of the user.

(E) The image processing device of (D) further including an image editing means for editing the display image with a scale figure indicating the actual dimension on a plane at a scale reference height with respect to the first image.

The front image used in the image processing device of (A) may be an image photographed with the camera in front arrangement, or may be an image front converted from the image photographed with the camera in slanted arrangement. According to such image processing device, the scale information and the scale reference height consistent each other are available, and the two dimensional image processing is performed on the object to be measured using the scale information and the three dimensional measurement is also performed. Therefore if the difference between the front height obtained by the three dimensional measurement and the scale reference height is large, the error is known to exist in the result of the two dimensional image process using the scale information.

Furthermore, if the scale information is calculated from the scale reference height with the front height of the location to be measured as the scale reference height, the scale information can be easily set even if the type of object is changed and the height of the location to be measured is changed. The front height for defining the scale information may be specified by the user or may be measured by the image processing device itself.

According to the image processing device of (B), if the calculated three dimensional coordinate is not within the allowable range of the front height, a difference larger than the assumed extent is known to exist between the scale indicated by the scale information used in the two dimensional image processing means and the actual scale of the first image.

According to the image processing device of (C), a more accurate measurement is performed for the object since the two dimensional image processing is performed using the scale information calculated by the actual measured value of the front height.

According to the image processing device of (D), when the scale reference height is adjusted so as to substantially match the actual front height of the location targeting to be performed with the three dimensional measurement based on the operation of the user, the range where the location to be measured may appear on the second image becomes small. Therefore, if the position corresponding to the position specified on the first image is specified with the relevant small range as the target, the possibility of mistaking the correspondence of the position to be measured between the first image and the second image becomes lower, and the time required for the calculation of specifying the corresponding position also becomes shorter. When the scale information is properly adjusted based on the operation of the user, if various two dimensional image processes involving measurement of dimension and area are applied with respect to the first image, the error in the result thereof becomes smaller.

According to the image processing device of (E), the user is able to perform the adjustment operation so that the relationship between the sizes of the displayed scale figure and the image of the location to be measured becomes correct when the editing image is displayed.

It should be apparent to those skilled in the art that the present invention may be embodied in many other specific forms without departing from the spirit or scope of the invention. Therefore, the present invention is not to be limited to the details given herein, but may be modified within the scope and equivalence of the appended claims.

The invention claimed is;

1. An image processing device for performing a process using a first image or a front image obtained based on an image for an object photographed with a first camera and a second image based on an image photographed with a second camera arranged so at to photograph the object from a direction different from the direction photographed with the first camera, the image processing device comprising:
   a setting means for a user to perform a setting on a specified region using a setting image or the front image obtained based on the image for a setting object photographed with the first camera;
   a position specifying means for defining a specified region based on the setting with respect to the first image or the front image obtained based on the image for an object to be photographed with the first camera and specifying a position on the object within the specified region;
   a three dimensional measurement means for specifying a position on the second image corresponding to the position specified on the first image and calculating a three dimensional coordinate using the specified position on the first image and the position on the second image; and
   a conversion means for performing a conversion calculation of converting a slant image, photographed with the first camera arranged so as to photograph the object from a slanted direction, to the front image.

2. The image processing device according to claim 1, wherein
   the setting image is obtained by converting the image for a setting image photographed with the first camera in a slanted direction with the conversion means; and
   the first image is obtained by converting the image for the object to be measured photographed with the first camera in the slanted direction with the conversion means.

3. The image processing device according to claim 2, wherein the scale information for associating the dimension in the front image converted by the conversion means and the actual dimension of the location to be measured, a value of scale reference height or a front height consistent with the scale information, and a value of the allowable range of the front height defined so as to include the scale reference height are available, and the image processing device further comprises:
   a two dimensional image processing means for performing a two dimensional image process on the first image using the scale information; and
   a determining means for determining whether or not the front height indicated by the three dimensional coordinate calculated by the three dimensional means is within the allowable range.

4. The image processing device according to claim 2, further comprising:
   a scale information calculating means for calculating scale information associating the dimension in the front image converted by the conversion means and the actual dimension of the location to be measured using the front height indicated by the three dimensional coordinate calculated by the three dimensional measurement means; and
   a two dimensional image processing means for performing the two dimensional image process on the first image using the scale information.

5. The image processing device according to claim 2, wherein scale information for associating the dimension in the front image converted by the conversion means and the actual dimension of the location to be measured, and a value of scale reference height or a front height consistent with the scale information are available, and the image processing device further comprises:
   an adjustment means for coherently changing the scale reference height and the scale information based on the operation of the user.

6. The image processing device according to claim 5, further including an image editing means for editing the display image with a scale figure indicating the actual dimension in a plane at a scale reference height with respect to the first image.

7. An image processing device for performing a process using a first image or a front image obtained based on an image for an object photographed with a first camera in a slanted direction and a second image based on an image photographed with a second camera arranged so as to photograph the object from a direction different from the direction photographed with the second camera, the image processing device comprising:
   a conversion means for performing a conversion calculation for converting a slant image, photographed with the first camera arranged to photograph the object from a slanted direction, to the front image;
   a setting means for the user to perform a setting on a position to be measured using a setting image obtained by converting the image obtained for a setting image photographed with the first camera;
   a position specifying means for specifying a position on the object based on the setting in the first image obtained by converting the image obtained for an object to be photographed with the camera with the conversion means; and
   a three dimensional measurement means for specifying a position in the second image corresponding to the position specified on the first image and calculating a three dimensional coordinate using the specified position on the first image and the position on the second image.

8. The image processing device according to claim 7, wherein the scale information for associating the dimension in the front image converted by the conversion means and the actual dimension of the location to be measured, a value of scale reference height or a front height consistent with the scale information, and a value of the allowable range of the front height defined so as to include the scale reference height are available, and the image processing device further comprises;
   a two dimensional image processing means for performing a two dimensional image process on the first image using the scale information; and
   a determining means for determining whether or not the front height indicated by the three dimensional coordinate calculated by the three dimensional means is within the allowable range.

9. The image processing device according to claim 7, further comprising:
- a scale information calculating means for calculating the scale information associating the dimension in the front image converted by the conversion means and the actual dimension of the location to be measured using the front height indicated by the three dimensional coordinate calculated by the three dimensional measurement means; and
- a two dimensional image processing means for performing the two dimensional image process on the first image using the scale information.

10. The image processing device according to claim 7, wherein the scale information for associating the dimension in the front image converted by the conversion means and the actual dimension of the location to be measured, and the value of scale reference height or a front height consistent with the scale information are available, and the image processing device further comprises:
- an adjustment means for coherently changing the scale reference height and the scale information based on the operation of the user.

11. The image processing device according to claim 10, further including an image editing means for editing the display image with a scale figure indicating the actual dimension in a plane at a scale reference height with respect to the first image.

12. An image processing method for performing a process using a first image of a front image obtained based on an image for an object photographed with a first camera and a second image based on an image photographed with a second camera arranged so at to photograph the object from a direction different from the direction photographed with the first camera, the image processing method comprising:
- setting step of displaying a setting image of a front image obtained based on the image for a setting object photographed with the first camera, and having a user perform a setting for a specified region using the setting image;
- position specifying step of defining a specified region based on the setting with respect to the first image of the front image obtained based on the image for an object to be photographed with the first camera and specifying a position on the object within the specified region;
- three dimensional measurement step of specifying a position on the second image corresponding to the position specified on the first image and calculating a three dimensional coordinate using the specified position on the first image and the position on the second image; and
- a conversion step of performing a conversion calculation of converting a slant image, photographed with the first camera arranged so as to photograph the object from a slanted direction, to the front image.

13. An image processing method for performing a process using a first image or a front image obtained based on an image for an object photographed with a first camera arranged so as to photograph the object in a slanted direction and a second image based on an image photographed with a second camera arranged so at to photograph the object from a direction different from the direction photographed with the first camera, the image processing method comprising:
- setting step of converting the image for a setting image photographed with the first camera to a setting image through a conversion calculation converting a slant image photographed with the first camera to the front image, and having a user perform a setting on a position to be measured using the setting image;
- position specifying step of converting the image for the object to be photographed with the first camera to a first image through the conversion calculation and specifying the position on the object based on the setting on the first image; and
- three dimensional measurement step of specifying a position on the second image corresponding to the position specified on the first image and calculating a three dimensional coordinate using the specified position on the first image and the position on the second image.

* * * * *